(12) United States Patent
Kim et al.

(10) Patent No.: US 11,552,907 B2
(45) Date of Patent: Jan. 10, 2023

(54) EFFICIENT PACKET QUEUEING FOR COMPUTER NETWORKS

(71) Applicant: Fungible, Inc., Santa Clara, CA (US)

(72) Inventors: Paul Kim, Fremont, CA (US); Philip A. Thomas, San Jose, CA (US)

(73) Assignee: FUNGIBLE, INC., Santa Clara, CA (US)

( * ) Notice: Subject to any disclaimer, the term of this patent is extended or adjusted under 35 U.S.C. 154(b) by 57 days.

(21) Appl. No.: 16/947,754

(22) Filed: Aug. 14, 2020

(65) Prior Publication Data
US 2021/0051116 A1 Feb. 18, 2021

Related U.S. Application Data

(60) Provisional application No. 62/888,263, filed on Aug. 16, 2019.

(51) Int. Cl.
| | |
|---|---|
| *H04L 12/883* | (2013.01) |
| *H04L 49/9015* | (2022.01) |
| *H04L 49/90* | (2022.01) |
| *H04L 49/00* | (2022.01) |

(52) U.S. Cl.
CPC ...... *H04L 49/9015* (2013.01); *H04L 49/3072* (2013.01); *H04L 49/9078* (2013.01)

(58) Field of Classification Search
CPC ............. H04L 49/3072; H04L 49/9015; H04L 49/9078; H04L 49/9005
USPC ........................................................ 370/412
See application file for complete search history.

(56) References Cited

U.S. PATENT DOCUMENTS

| | | | |
|---|---|---|---|
| 9,306,876 B1* | 4/2016 | Ulman ................ | G06F 13/1647 |
| 9,658,951 B1* | 5/2017 | Shumsky ............ | G06F 12/0223 |
| 10,067,690 B1* | 9/2018 | Matthews ............ | G06F 12/023 |
| 10,841,245 B2 | 1/2020 | Gray et al. | |
| 10,659,254 B2 | 5/2020 | Sindhu et al. | |
| 10,999,223 B1* | 5/2021 | Jain ..................... | H04L 49/9015 |
| 2004/0218592 A1* | 11/2004 | Nagar .................. | H04L 49/90 |
| | | | 370/381 |
| 2007/0133581 A1* | 6/2007 | Ma ....................... | G06F 12/023 |
| | | | 370/412 |
| 2013/0091332 A1* | 4/2013 | Vankov ................. | G06F 9/544 |
| | | | 711/153 |
| 2014/0321474 A1* | 10/2014 | Lin ..................... | H04L 49/9015 |
| | | | 370/417 |
| 2015/0215226 A1* | 7/2015 | Peled .................. | H04L 47/6275 |
| | | | 370/412 |

(Continued)

*Primary Examiner* — Robert J Lopata
(74) *Attorney, Agent, or Firm* — Shumaker & Sieffert, P.A

(57) ABSTRACT

A method during a first cycle includes receiving, at a first port of a device, a plurality of network packets. The method may include storing, by the device, at least some portion of a first packet of the plurality of network packets at a first address within a first record bank and storing, by the device and concurrent with storing the at least some portion of the first packet from the first address, at least some portion of a second packet of the plurality of network packets at a second address within a second record bank, different than the first record bank. The method may further include storing, by the device, the first address within the first record bank and the second address within the second record bank in the first link stash associated with the first record bank and updating, by the device, a tail pointer to reference the second address.

33 Claims, 14 Drawing Sheets

(56) References Cited

U.S. PATENT DOCUMENTS

| | | |
|---|---|---|
| 2018/0183733 A1* | 6/2018 | Dcruz .................... G06F 3/0679 |
| 2019/0012278 A1 | 1/2019 | Sindhu et al. |
| 2019/0104206 A1 | 4/2019 | Goel et al. |
| 2019/0289102 A1 | 9/2019 | Goel et al. |
| 2020/0259766 A1* | 8/2020 | Tian ...................... H04L 49/252 |
| 2020/0280462 A1 | 9/2020 | Sindhu et al. |

* cited by examiner

EFFICIENT PACKET QUEUEING FOR COMPUTER NETWORKS

This Applications claims the benefit of U.S. Provisional Patent Application 62/888,263, filed Aug. 16, 2019, the entire content of which is incorporated herein by reference.

TECHNICAL FIELD

This disclosure generally relates to computer networks and, more particularly, packet queueing for computer networks.

BACKGROUND

In a typical computer network, a large collection of interconnected servers provides computing and/or storage capacity for execution of various applications. A data center is one example of a large-scale computer network and typically hosts applications and services for subscribers, i.e., customers of the data center. The data center may, for example, host all of the infrastructure equipment, such as compute nodes, networking and storage systems, power systems, and environmental control systems. Data centers vary greatly in size, with some public data centers containing hundreds of thousands of servers, which are usually distributed across multiple geographies for redundancy.

In most data centers, clusters of storage systems and application servers are interconnected via a high-speed switch fabric provided by one or more tiers of physical network switches and routers. In some instances, high bandwidth networking switches require the ability to enqueue network packets from multiple sources concurrently with a dequeue process from the same pool of memory while avoiding memory collisions.

SUMMARY

In general, the disclosure describes techniques that enable data centers to enqueue network packets from multiple sources concurrently with a dequeue process from the same pool of memory while avoiding memory collisions. The present disclosure describes, in some examples, dividing memory into record banks, link banks, and link stashes where each record bank is associated with a link bank and a link stash. For example, to allow N writers and one reader concurrent access to memory while avoiding writer-writer collisions and/or writer-reader collisions, the memory is divided into N+1 (or more) single-port record banks and corresponding N+1 (or more) single-port link banks. In some examples, when a particular writer pushes a first packet to a non-empty queue (e.g., a linked list), the particular writer writes the record to a free address in a first record bank, and writes a link containing the address of that first packet to a previous link stash associated with the previously used record bank at the tail of the queue. The address of the newly written first packet becomes the new tail of the queue. In some examples, when the contents of the first link stash are valid, a writer evicts the contents of the first link stash associated with the first record bank when the writer writes the record to the first record bank. In this way, the memory of the first link stash may be used to store a link to the next packet that will be enqueued.

In some implementations, a reader can read the packet at the head of the queue by reading the packet from the record bank address contained in the head pointer. In some examples, a data processing unit (DPU) sets the link (e.g., the target address) stored in the corresponding link stash or corresponding link bank associated with the packet being read as the new head of the queue. Because packets are stored in different record banks and N+1 (or more) record banks are used for N writers, writer collision may possibly be avoided while allowing for a concurrent read to occur during the same cycle as the write performed by one or more of the N writers.

In one example, various aspects of the techniques are directed to a method comprising, during a first cycle: receiving, at a first port of a device, a plurality of network packets; storing, by the device, at least some portion of a first packet of the plurality of network packets at a first address within a first record bank; storing, by the device and concurrent with storing the at least some portion of the first packet from the first address, at least some portion of a second packet of the plurality of network packets at a second address within a second record bank, different than the first record bank; storing, by the device, the first address within the first record bank and the second address within the second record bank in the first link stash associated with the first record bank; and updating, by the device, a tail pointer to reference the second address.

In another example, various aspects of the techniques are directed to a device comprising memory, and processing circuitry having access to the memory and configured to, during a first cycle: receive a plurality of network packets; store at least some portion of a first packet of the plurality of network packets at a first address within a first record bank; store, concurrent with storing the at least some portion of the first packet from the first address, at least some portion of a second packet of the plurality of network packets at a second address within a second record bank, different than the first record bank; store the first address within the first record bank and the second address within the second record bank in the first link stash associated with the first record bank; and update a tail pointer to reference the second address.

In another example, various aspects of the techniques are directed to a computer-readable storage medium comprising instructions that, when executed, configure processing circuitry of a device to, during a first cycle: receive a plurality of network packets; store at least some portion of a first packet of the plurality of network packets at a first address within a first record bank; store, concurrent with storing the at least some portion of the first packet from the first address, at least some portion of a second packet of the plurality of network packets at a second address within a second record bank, different than the first record bank; store the first address within the first record bank and the second address within the second record bank in the first link stash associated with the first record bank; and update a tail pointer to reference the second address.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
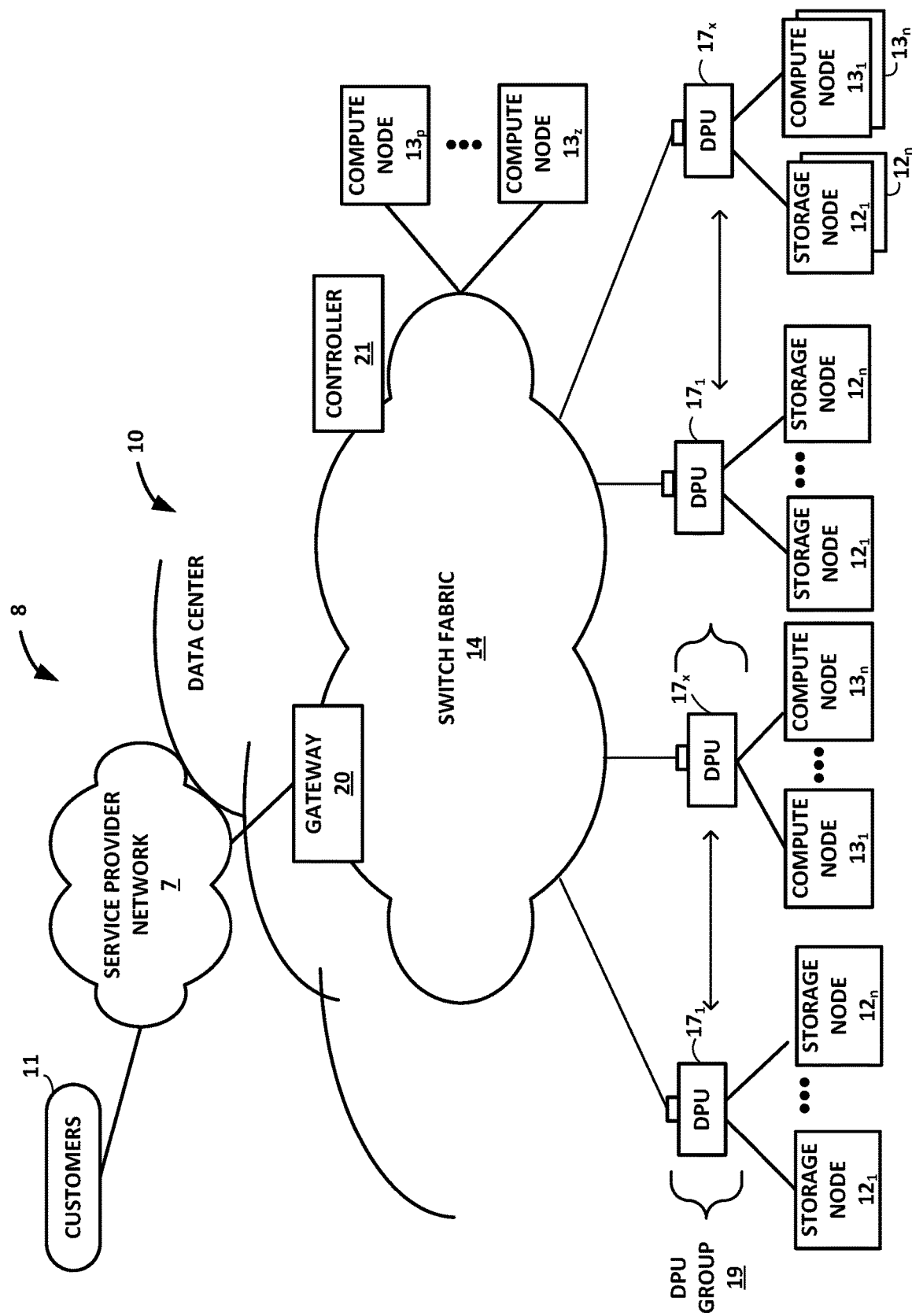
FIG. 1 is a block diagram illustrating an example network having a data center in which examples of the techniques described herein may be implemented.

FIG. 1 is a block diagram illustrating an example system 8 having a data center 10 in which examples of the techniques described herein may be implemented. In general, data center 10 provides an operating environment for applications and services for customers 11 coupled to the data center by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In this example, data center 10 includes a set of storage nodes 12 and compute nodes 13 interconnected via a high-speed switch fabric 14. In some examples, storage nodes 12 and compute nodes 13 are arranged into multiple different groups, each including any number of nodes up to, for example, n storage nodes $12_1$-$12_n$ and n compute nodes $13_1$-$13_n$ (collectively, "storage nodes 12" and "compute nodes 13"). Although shown as connecting via data processing units (DPUs) 17, data center 10 may include compute nodes $13_p$-$17_z$ coupled directed to switch fabric 14, where such compute nodes $13_p$-$13_z$ may act as the requesting node as described in more detail below. As such, compute nodes 13 may also include compute nodes $13_p$-$17_z$. Storage nodes 12 and compute nodes 13 provide storage and computation facilities, respectively, for applications and data associated with customers 11 and may be physical (bare-metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10 in accordance with one or more embodiments of this disclosure. In some examples, SDN controller 21 may operate in response to configuration input received from a network administrator.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, each of storage nodes 12 and compute nodes 13 is coupled to switch fabric 14 by a DPU 17. As further described herein, in one example, each DPU 17 is a highly programmable I/O processor specially designed for offloading certain functions from storage nodes 12 and compute nodes 13. In one example, each of DPUs 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each DPU 17 includes components for fully implementing and processing network and storage stacks on behalf of one or more storage nodes 12 or compute nodes 13.

In addition, DPUs 17 may be programmatically configured to serve as a security gateway for its respective storage nodes 12 or compute nodes 13, freeing up the processors of the servers to dedicate resources to application workloads. In some example implementations, each DPU 17 may be viewed as a network interface subsystem that implements full offload of the handling of data packets (with zero copy in server memory) and storage acceleration for the attached server systems.

In one example, each DPU 17 may be implemented as one or more application-specific integrated circuit (ASIC) or other hardware and software components, each supporting a subset of the servers. DPUs 17 may also be referred to as access nodes, or devices including access nodes. In other words, the term access node may be used herein interchangeably with the term DPU. Additional example details of various example DPUs are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of both being incorporated herein by reference In example implementations, DPUs 17 are configurable to operate in a standalone network appliance having one or more DPUs. For example, DPUs 17 may be arranged into multiple different DPU groups 19, each including any number of DPUs up to, for example, x DPUs $17_1$-$17_x$. As such, multiple DPUs 17 may be grouped (e.g., within a single electronic device or network appliance), referred to herein as a DPU group 19, for providing services to a group of servers supported by the set of DPUs internal to the device. In one example, a DPU group 19 may comprise four DPUs 17, each supporting four servers so as to support a group of sixteen servers.

In the example of FIG. 1, each DPU 17 provides connectivity to switch fabric 14 for a different group of storage nodes 12 or compute nodes 13 and may be assigned respective IP addresses and provide routing operations for the storage nodes 12 or compute nodes 13 coupled thereto. As described herein, DPUs 17 provide packet routing, switching, parsing, and/or queuing functions for communications from/directed to the individual storage nodes 12 or compute nodes 13. For example, each DPU may concurrently receive multiple network packets and queue or buffer those packets to avoid dropping or losing packets (e.g., when an egress port becomes too congested) before they can be routed. As shown in FIG. 1, each DPU 17 includes a set of edge-facing electrical or optical local bus interfaces for communicating with a respective group of storage nodes 12 or compute nodes 13 and one or more core-facing electrical or optical interfaces for communicating with core switches within switch fabric 14.

In addition, DPUs 17 described herein may provide additional services, such as storage (e.g., integration of solid-state storage devices), security (e.g., encryption), acceleration (e.g., compression), I/O offloading, and the like. In some examples, one or more of DPUs 17 may include storage devices, such as high-speed solid-state drives or rotating hard drives, configured to provide network accessible storage for use by applications executing on the servers. Although not shown in FIG. 1, DPUs 17 may be directly coupled to each other, such as direct coupling between DPUs in a common DPU group 19, to provide direct interconnectivity between the DPUs of the same group. For example, multiple DPUs 17 (e.g., 4 DPUs) may be positioned within a common DPU group 19 for servicing a group of servers (e.g., 16 servers).

As one example, each DPU group 19 of multiple DPUs 17 may be configured as standalone network device, and may be implemented as a two rack unit (2RU) device that occupies two rack units (e.g., slots) of an equipment rack. In another example, DPU 17 may be integrated within a server, such as a single 1RU server in which four CPUs are coupled to the forwarding ASICs described herein on a mother board deployed within a common computing device. In yet another example, one or more of DPUs 17, storage nodes 12, and compute nodes 13 may be integrated in a suitable size (e.g., 10RU) frame that may, in such an example, become a network storage compute unit (NSCU) for data center 10. For example, a DPU 17 may be integrated within a mother board of a storage node 12 or a compute node 13 or otherwise co-located with a server in a single chassis.

In some example implementations, DPUs 17 interface and utilize switch fabric 14 so as to provide full mesh (any-to-any) interconnectivity such that any of storage nodes 12 or compute nodes 13 may communicate packet data for a given packet flow to any other of the servers using any of a number of parallel data paths within the data center 10. For example, in some example network architectures, DPUs spray individual packets for packet flows between the DPUs and across some or all of the multiple parallel data paths in the data center switch fabric 14 and reorder the packets for delivery to the destinations so as to provide full mesh connectivity.

In this way, DPUs 17 interface and utilize switch fabric 14 so as to provide full mesh (any-to-any) interconnectivity such that any of storage nodes 12 or compute nodes 13 may communicate packet data for a given packet flow to any other of the servers using any of a number of parallel data paths within the data center 10. For example, in some example network architectures, DPUs spray individual packets for packet flows between the DPUs and across some or all of the multiple parallel data paths in the data center switch fabric 14 and reorder the packets for delivery to the destinations so as to provide full mesh connectivity.

As described herein, a data transmission protocol referred to as a Fabric Control Protocol (FCP) may be used by the different operational networking components of any of DPUs 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion.

In general, FCP enables spray of packets of a flow to all paths between a source and a destination node, and may provide numerous advantages, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support.

As further described herein, DPUs 17 of FIG. 1 may concurrently receive network packets from multiple sources (e.g., from switch fabric 14, one or more storage nodes 12, and/or one or more compute nodes 13) and enqueue, buffer, parse, process, and/or modify the packets before forwarding or transmitting those packets (e.g., to a destination device). Each of DPUs 17 may include one or more ingress ports for receiving network packets and one or more egress ports for outputting (e.g., routing). For example, a DPU 17 may receive multiple packets at an ingress port and enqueue those packets (e.g., store or write those packets to memory) for transmission to a destination device in a queue (e.g., implemented as a linked list). A DPU 17 reads a packet from the top of the queue (e.g., as indicated by a head pointer) and transmits that packet out of an egress port (e.g., to a destination device). In some examples, a DPU 17 may concurrently receive and transmit network packets in the same processing cycle.

Each DPU 17 may allocate memory for queuing network packets for each ingress port, each egress port, and/or each ingress and egress port pair. For example, DPU 17 may receive network packets faster than DPU 17 can process (e.g., route) for a particular egress port corresponding to a destination device (e.g., compute node 13, storage node 12) and the DPU 17 may buffer or enqueue the received network packets in the memory allocated for that particular egress port. In this way, DPU 17 may later read each network packet (e.g., dequeued off of the buffer/queue by a reader in a dequeue process). However, in some instances, when two or more network packet corresponding to the same egress port arrive concurrently (e.g., during the same processing cycle), the two or more write operations for enqueuing the two or more network packets may result in a write-write collision that can cause one or more network packets to be dropped or lost. In other words, in some instants, two or more writers (e.g., write operations executed by DPU 17) cannot write to the same pool of memory (e.g., the same buffer) concurrently, which results in network packet losses. Similarly, a concurrent read (e.g., dequeue or read operation executed by DPU 17) and write operations on the same buffer/queue during the same processing cycle may result in a read-write collision that may cause one or more packets to be dropped and/or may cause a delay in enqueuing one or more of the received network packets. In some examples, a queue or buffer for a particular egress port may become too contested, which may result in packet loss.

In accordance with the techniques of the disclosure, a DPU (e.g., DPU $17_1$) may allocate memory (e.g., divide the memory) for each egress port of DPU $17_1$ to allow concurrent memory access operations (e.g., write-write operations and/or read-write) on the same pool of memory. The DPU can then be configured to implement the buffer/queue in one or more linked lists spanning across the divided memory for each egress port. In this way, the DPE can be configured to perform enqueue and/or dequeue processes on the same pool of memory while potentially avoiding or at least reducing memory access collisions (e.g., writer-writer collisions and/or reader-writer collisions), as described in further detail below.

In some examples, a DPU (e.g., DPU $17_1$) may allocate memory for each egress port of DPU $17_1$, dividing the memory into a plurality of record banks, a plurality of link banks, and a plurality of link stashes where each record bank is associated with a link bank and a link stash. For example, to allow N writers (e.g., for enqueueing N packets) and one reader (e.g., for dequeuing a packet) concurrent access to memory, the memory may be divided into N+1 (or more) single-port record banks and corresponding N+1 (or more) single-port link banks. In some examples, the N record banks can be used to store network packets (or at least some portion of a network packet) while the N link banks and/or link stashes can store the links between the network packets (or portions of the network packets) stored in the record banks. In other words, DPU $17_1$ may use the combination of network banks, link banks, and/or link stashes to implement a buffer or queue in the form of a linked list by using the record banks to store data (e.g., network packet data) and the link banks and/or link stashes to store the links between the data in the record banks. In this way, the N writers and the one reader can concurrently access the same buffer or queue during the same processing cycle by each writer or reader accessing a different bank from the same pool of memory while avoiding memory access collisions (e.g., writer-writer and/or reader-writer collisions). Further each NPU may maintain a head pointer corresponding to the front of the buffer or queue (for reading or dequeuing) and a tail pointer corresponding the end of the buffer or queue (e.g., for enqueuing). In some examples, the head and tail pointers comprise globally addressed pointers.

A link stash may include a valid bit (e.g., to indicate whether the link stash entry is valid or usable) and a link from a first entry (e.g., a first network packet) in a first record bank corresponding to the link stash to a second entry in a second record bank, the link comprising a first address (e.g., a current address) of the first entry in the first record bank and a second address (e.g., the target address) of the second entry in the second record bank. In some examples, when a writer (e.g., in an enqueue process) pushes a first packet to a non-empty queue (e.g., a linked list), the DPU writes the record to a free first address in a first record bank, and writes a link containing the address of that first packet (e.g., a pointer to the first packet) to a previous link stash associated with the previously used record bank at the tail of the queue and sets the valid bit of the previous link stash to valid.

The address of the newly written first packet becomes the new tail of the queue (e.g., the address is stored in a globally addressed tail pointer). In some examples, when the enqueue process of a DPU writes a record (e.g., an entry) to a first record bank and the contents of the first link stash associated with the first record bank are valid (e.g., when the first link stash contains a valid link to another record bank), the enqueue process evicts the contents of the first link stash (e.g., the contents of the first link stash associated with the first record bank are pushed to the first link bank associated with the first record bank at the first address corresponding to the first address of the first packet within the first record bank). In this way, the memory of the first link stash may be used to store a link from the first network packet (e.g., the first entry at the first address of the first record bank) to the address where the next packet to is enqueued. Moreover, by writing network packets to different record banks, writer-writer collisions may be reduced.

In some implementations, a reader (e.g., in a dequeue process) can read the packet at the head of the queue by reading the packet from the record bank address contained in the head pointer. In some examples, a DPU may set the link stored in the corresponding link stash or corresponding link bank associated with the packet being read as the new head of the queue (e.g., the address of the packet in another record bank is stored in the globally addressed head pointer). Because packets are stored in different record banks and N+1 (or more) record banks are used for N writers, memory collisions (e.g., writer-writer and/or reader-writer collisions) may be reduced even when a concurrent read occurs during the same processing cycle as N write operations.

In some examples, DPUs 17 may parse incoming packets and different writers may write different parts of the same packet to different cells. For example, each record bank can be split into cells or microcells that can contain entire packets or at least some portion of a packet (e.g., with each portion of a packet processes as a network packet as described herein). In this way, network bandwidth can be more efficiently utilized. It should be understood that in this disclosure, a network packet can represent a portion of a network packet.

In operation, DPUs 17 may receive a plurality of network packets at a first port (e.g., an ingress port). In some examples these network packets may originate from storage nodes 12, compute nodes 13, gateway device 20, controller 21, or any other device for routing to a destination device. For example, a DPU 17x may receive a plurality of network packets via switch fabric 14 during a first cycle for routing to compute node $13_1$. In some examples, the plurality of network packets may originate from the same source or from different sources.

To process the received plurality of network packets for routing to compute node $13_1$, DPU 17x will enqueue the plurality of network packets at the queue or buffer associated with the egress port corresponding to compute node $13_1$. As described above, DPUs may implement a queue or buffer by diving (e.g., allocating) memory associated with an egress port (and/or an ingress port) into record banks (e.g., to store network packet data), link banks (e.g., to store links between network packet data across different record banks), and link stashes (e.g., to store links between network packet data across different record banks).

For example, to enqueue the plurality of network packets, DPU 17x will store at least some portion of a first packet of the plurality of network packets at a first address within a first record bank, and store, concurrent with storing the at least some portion of the first packet from the first address, at least some portion of a second packet of the plurality of network packets at a second address within a second record bank, different than the first record bank. As described above, DPU 17x may parse the plurality of network packets to more efficiently utilize network bandwidth. For example, the DPU may split each record bank (e.g., the first and second record banks) into cells or microcells that can store entire network packets or at least some portion of a network packet.

By splitting the network packets into portions and splitting the record banks into cells or microcells to store those portions, the amount of unused allocated space in each cell or microcell can be reduced—particularly when small packets are being routed. DPU $17x$ will also store the first address within the first record bank (e.g., the current address) and the second address within the second record bank (e.g., the target address) (e.g., the link or pointer from the at least some portion of the first packet in the first record bank to the at least some portion of the second packet in the second record bank) in the first link stash associated with the first record bank. In some examples, DPU 17 will also store a valid bit in the first link stash indicating that the entry in the first link stash is valid. A DPU 17 may update a tail pointer to reference the second address. In other words, the at least some portion of the second packet at the second address becomes the tail of the of the linked list implementing the queue or buffer for the egress port corresponding to compute node $13_1$.

In some examples, a DPU may allow a concurrent read operation of a record bank (e.g., a third record bank) while concurrently writing to other record banks (e.g., to the first and second record banks). For example, for two writers and one reader, the DPU can include three or more sets of record banks, link banks and links stashes to help avoid writer-writer and reader writer collisions. A DPU 17 may allow a concurrent read operation of the queue or buffer corresponding to an egress port. For example, DPU $17x$ may perform a read operation, during the first cycle, by obtaining the first address from a head pointer (e.g., obtain the address or "head address" corresponding to the head of the queue or buffer) and reading the at least some portion of the first packet at the first address from the first record bank concurrent with storing the at least some portion of the first packet from the first address (e.g., performing concurrent read and write operations on the same record bank). A DPU 17 can read the first link stash and update the head pointer to reference the second address (e.g., the target address) within the second record bank, setting the at least some portion of the second packet as the new head of the queue or buffer.

In some examples, a DPU 17 reads the first link stash in accordance with a determination that the first link stash is valid (e.g., determining that the valid bit for first link stash indicated that the link in the first link stash is valid). The DPU 17 may read the target address (e.g., the address to another record bank) from the link bank associated with the record bank being read and update the head pointer to reference the target address read from that link bank. For example, a DPU 17 may obtain the second address from the first address of a first link bank associated with the first record bank in accordance with a determination that the first link stash is not valid. In certain examples, the address obtained from the head pointer corresponds to the address in the record bank and the corresponding address in the link bank for that record (e.g., network packet can be read at the head address from the first record bank and the new head address can be read at the head address from the first link banks). In some examples, the DPU can deallocate the memory at the address of the record bank and at the address of the link bank after the network packet data is read (e.g., DPU $17x$ may deallocate the memory at the first address within the first record bank and the memory corresponding to the first address within a first link bank associated with the first record bank). By deallocating record bank and link bank addresses, the DPU makes that memory available for enqueuing more network packet data.

In some examples, a DPU 17 may receiving, at the first port of the device, a second plurality of network packets during a second cycle (e.g., after the first cycle). A DPU 17 may store at least some portion of a third packet of the second plurality of network packets at a third address within a third record bank and store the second address within the second record bank and the third address within the third record bank in a second link stash associated with the second record bank. In other words, a DPU 17 stores the link (or pointer) from the least some portion of the second packet to the least some portion of the third packet at the second link stash.

A DPU 17 may also evict a third link stash associated with the third record bank. In some examples, a DPU 17 may evict the third link stash associated with the third record bank in response to determining that the entry (e.g., the link) is in third link stash is valid (e.g., as indicated by the valid bit in the third link stash). For example, a DPU 17 may evict the third link stash associated with the third record bank by setting to valid bit of the third link stash to invalid (e.g., 0, NULL, FALSE, or any other value), storing (e.g., copying) the link (e.g., from the third record bank to another record bank) contained in the third link stash to the third link bank associated with the third record bank (e.g., to preserve the link), and/or deallocating the memory in the third link stash storing the link.

During the same second cycle, a DPU 17 may store, concurrent with storing the at least some portion of the third packet, at least some portion of a fourth packet of the second plurality of network packets at a fourth address within a fourth record bank, different than the third record bank, and store the third address within the third record bank and the fourth address within the fourth record bank in the third link stash. In some examples, a DPU 17 may set the valid bit of the third link stash to valid (e.g., 1, TRUE, or any other value) in response to storing the third address within the third record bank (e.g., the current address) and the fourth address within the fourth record bank (e.g., the target address) in the third link stash. A DPU 17 may also evict a third link stash associated with the third record bank and update the tail point to reference the fourth address (e.g., such that the least some portion of the fourth packet becomes the tail of the linked list implementing the queue or buffer). In some examples, link stashes are implemented using single entry flops or using single-port static random-access memories (SRAMs) for faster processing capabilities.

The techniques may provide certain technical advantages. For example, the techniques may help avoid dropping or losing packets (e.g., when an egress port becomes too congested). Further, the techniques may enable concurrent writers and readers perform enqueue and dequeue operation on a packet queue during the same processing cycle while helping avoid memory writer-writer and/o reader-writer collisions (e.g., by having each writer and/or reader access a different memory bank within the same pool of memory). Still further, the techniques may enable increased utilization of network bandwidth (e.g., by splitting record banks into cells or microcells that can contain entire packets or at least some portion of a packet).

Aspects of this disclosure relate to U.S. Provisional Patent Application No. 62/566,060, filed Sep. 29, 2017, entitled "Fabric Control Protocol for Data Center Networks with Packet Spraying over Multiple Alternate Data Paths," and U.S. Provisional Patent Application No. 62/642,798, filed Mar. 14, 2018, entitled "Flexible Processing Of Network Packets," the entire content of each of these applications is incorporated herein by reference.

Figure 2:
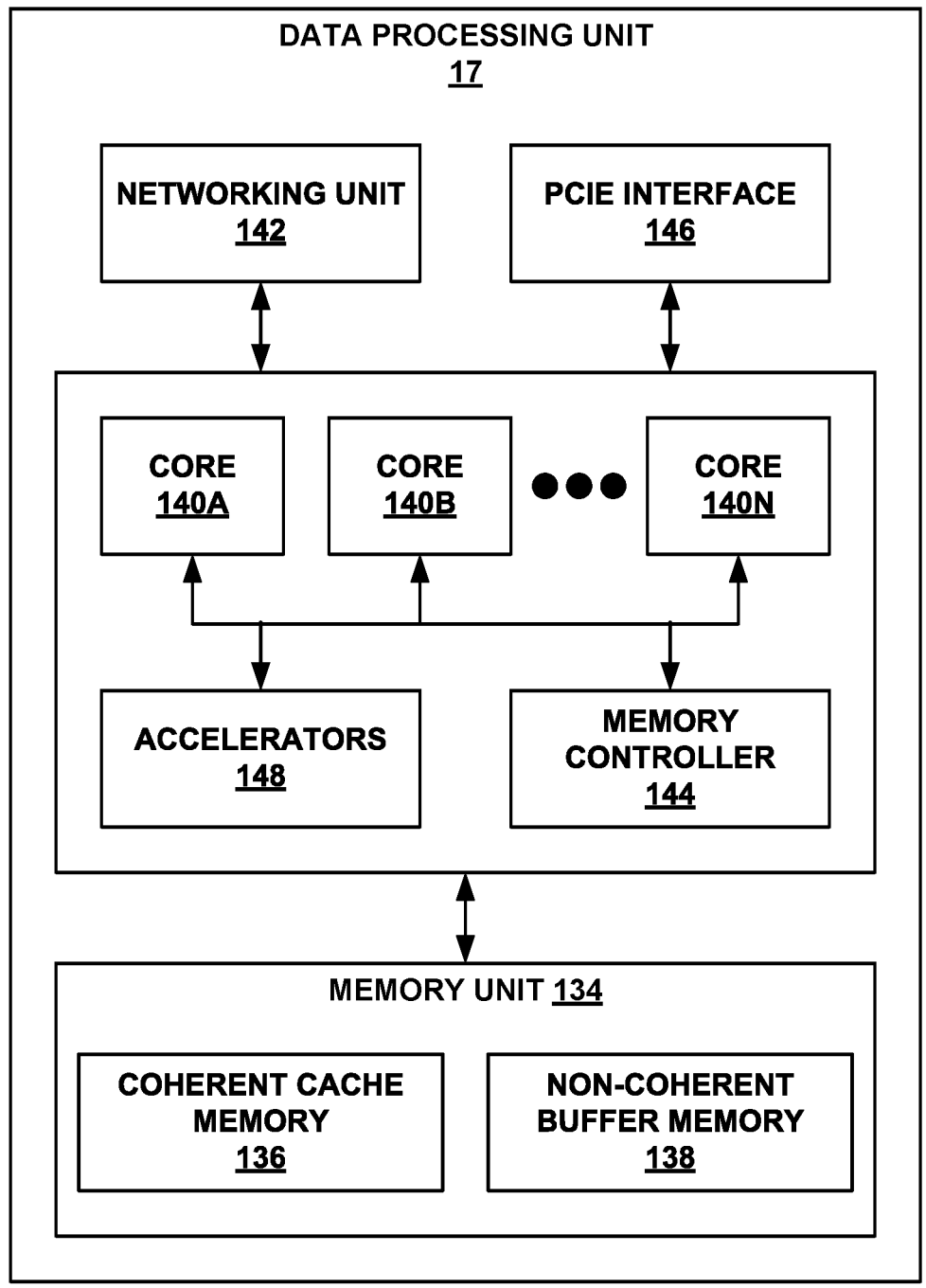
FIG. 2 is a block diagram illustrating an example data processing unit (DPU), in accordance with one or more aspects of the present disclosure.

FIG. 2 is a block diagram illustrating an example DPU 17 of FIG. 1 in further detail. DPU 17 generally represents a hardware chip implemented in digital logic circuitry. DPU 17 may operate substantially similar to any of DPUs $17_1$-$17_N$ of FIG. 1. Thus, DPU 17 may be communicatively coupled to a CPU, a GPU, one or more network devices, server devices, random access memory, storage media (e.g., solid state drives (SSDs)), a data center fabric, or the like, e.g., via PCI-e, Ethernet (wired or wireless), or other such communication media.

In the illustrated example of FIG. 2, DPU 17 includes a plurality of programmable processing cores 140A-140N ("cores 140") and a memory unit 134. Memory unit 134 may include two types of memory or memory devices, namely coherent cache memory 136 and non-coherent buffer memory 138. In some examples, plurality of cores 140 may include at least two processing cores. In one specific example, plurality of cores 140 may include six processing cores. DPU 17 also includes a networking unit 142, one or more PCIe interfaces 146, a memory controller 144, and one or more accelerators 148. As illustrated in FIG. 2, each of cores 140, networking unit 142, memory controller 144, PCIe interfaces 146, accelerators 148, and memory unit 134 including coherent cache memory 136 and non-coherent buffer memory 138 are communicatively coupled to each other.

In this example, DPU 17 represents a high performance, hyper-converged network, storage, and data processor and input/output hub. Cores 140 may comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or CISC (complex instruction set computing or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

As described herein, the new processing architecture utilizing a DPU may be especially efficient for stream processing applications and environments. For example, stream processing is a type of data processing architecture well suited for high performance and high efficiency processing. A stream is defined as an ordered, unidirectional sequence of computational objects that can be of unbounded or undetermined length. In a simple embodiment, a stream originates in a producer and terminates at a consumer, and is operated on sequentially. In some embodiments, a stream can be defined as a sequence of stream fragments; each stream fragment including a memory block contiguously addressable in physical address space, an offset into that block, and a valid length. Streams can be discrete, such as a sequence of packets received from the network (e.g., network packets), or continuous, such as a stream of bytes read from a storage device. A stream of one type may be transformed into another type as a result of processing. For example, TCP receive (Rx) processing consumes segments (fragments) to produce an ordered byte stream. The reverse processing is performed in the transmit (Tx) direction. Independently of the stream type, stream manipulation requires efficient fragment manipulation, where a fragment is as defined above.

In some examples, the plurality of cores 140 may be capable of processing a plurality of events related to each data packet of one or more data packets, received by networking unit 142 and/or PCIe interfaces 146, in a sequential manner using one or more "work units." In general, work units are sets of data exchanged between cores 140 and networking unit 142 and/or PCIe interfaces 146 where each work unit may represent one or more of the events related to a given data packet of a stream.

As one example, a Work Unit (WU) is a container that is associated with a stream state and used to describe (i.e. point to) data within a stream (stored). For example, work units may dynamically originate within a peripheral unit coupled to the multi-processor system (e.g. injected by a networking unit, a host unit, or a solid state drive interface), or within a processor itself, in association with one or more streams of data, and terminate at another peripheral unit or another processor of the system. The work unit is associated with an amount of work that is relevant to the entity executing the work unit for processing a respective portion of a stream. In some examples, one or more processing cores of a DPU may be configured to execute program instructions using a work unit (WU) stack.

In processing the plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

DPU 17 may act as a combination of a switch/router and a number of network interface cards. For example, networking unit 142 may be configured to receive one or more data packets (e.g., network packets) from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as network 7 of FIG. 1.

In this way, DPU 17 supports one or more high-speed network interfaces, e.g., Ethernet ports, without the need for a separate network interface card (NIC). Each of PCIe interfaces 146 may support one or more PCIe interfaces, e.g., PCIe ports, for connectivity to an application processor (e.g., an x86 processor of a server device or a local CPU or GPU of the device hosting DPU 17) or a storage device (e.g., an SSD). DPU 17 may also include one or more high bandwidth interfaces for connectivity to off-chip external memory (not illustrated in FIG. 2). Each of accelerators 148 may be configured to perform acceleration for various data-processing functions, such as look-ups, matrix multiplication, cryptography, compression, regular expressions, or the like. For example, accelerators 148 may comprise hardware implementations of look-up engines, matrix multipliers, cryptographic engines, compression engines, regular expression interpreters, or the like.

Memory controller 144 may control access to memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. In some examples, memory controller 144 may map the accesses based on one or more of an address range, an instruction or an operation code within the instruction, a special access, or a combination thereof. In some examples, the queues or buffers, including record banks, link banks, and/or link stashes, head pointer, and/or tail pointer are stored in either of coherent cache memory 136 or non-coherent buffer memory 138.

Additional details regarding the operation and advantages of the DPU are available in U.S. patent application Ser. No. 16/031,921, filed Jul. 10, 2018, and titled "DATA PROCESSING UNIT FOR COMPUTE NODES AND STORAGE NODES," and U.S. patent application Ser. No. 16/031,676, filed Jul. 10, 2018, and titled "ACCESS NODE FOR DATA CENTERS", the entire content of each of which is incorporated herein by reference.

Each of cores 140 may represent one or more processors configured to perform various aspects of the techniques described in this disclosure. For example, one or more of cores 140 may enqueue, buffer, parse, process, and/or modify received network packets as described in this disclosure. To enqueue or buffer network packets, one or more cores 140 may store network packet data in record banks and/or store links in link banks and/or link stashes.

In some examples, one or more cores 140 may perform eviction operations of link stashes (e.g., copy link information to the associated link bank, deallocate link stash memory, set the valid bit to invalid). In one or more examples, one or more cores 140 may perform dequeue operations on network packets from the queue or buffer (e.g., to route them out of an egress port). For example, one or more cores 140 may obtain a head address from the head pointer corresponding to an address in a first record bank and read the network packet data from the obtained head address at the first record bank.

The one or more cores 140 may read and write address information from a head pointer and/or from a tail pointer for the linked list used to implement the queue or buffer for network packet data. In some examples, the one or more cores 140 may read the link stored at the head address of a first link bank corresponding to the first record bank or from a first link stash corresponding to the first record bank and set the head pointer to the target address in the link read from the first link bank or the first link stash. When reading a link, the reader may consult the link stash associated with the link bank at the index associated with the list. If the entry is valid and its address matches the address being read (e.g., the head address), then the link from the entry is returned, and, if this is the last time the reader will read this link, the entry is also made invalid. Otherwise, if the entry is invalid or the address does not match the desired address, then the link is read from the link bank at the desired instead.

Figure 3:
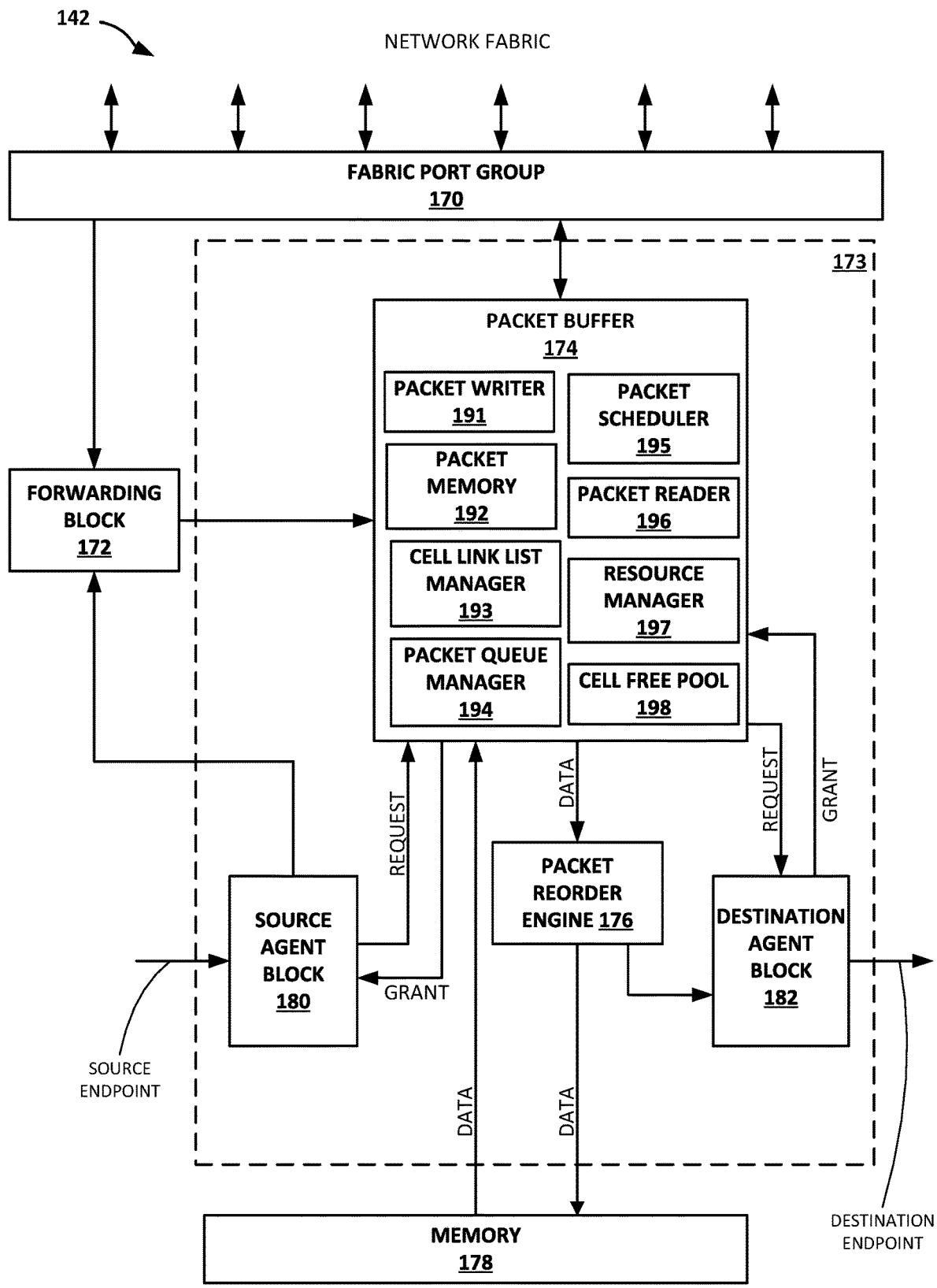
FIG. 3 is a block diagram illustrating an example networking unit of a DPU, in accordance with one or more aspects of the present disclosure.

FIG. 3 is a block diagram illustrating an example networking unit 142 of DPU 17 from FIG. 2, in more detail. Networking unit (NU) 142 exposes Ethernet ports, also referred to herein as fabric ports, to DPU 17 to the switch fabric. NU 142 connects to processing cores 140 and external servers and/or storage devices, such as SSD devices, via endpoint ports. NU 142 supports switching packets from one fabric port to another fabric port without storing the complete packet (i.e., transit switching), which helps to achieve low latency for transit traffic.

In this way, NU 142 enables creation of a fabric of access nodes with or without external switching elements. NU 142 may fulfill the following roles: (1) transmit packets from PCIe devices (servers, SSDs, storage nodes 12, and/or compute nodes 13) to the switch fabric and receive packets from the switch fabric and send them to the PCIe devices; (2) support switching packets from one fabric port to another fabric port; (3) support sending network control packets to an access node controller; and (4) implement fabric control protocol (FCP) tunneling. Further information about the fabric control protocol are available in of U.S. Provisional Patent Application No. 62/566,060, filed Sep. 29, 2017, entitled "Fabric Control Protocol for Data Center Networks with Packet Spraying over Multiple Alternate Data Paths," the entire content of which is incorporated herein by reference.

As illustrated in FIG. 3, NU 142 includes a fabric port group (FPG) 170, including ingress and egress ports. In other examples, NU 142 may include multiple FPGs 170. FPG 170 includes two or more fabric ports connected to the switch network. FPG 170 is configured to receive Ethernet packets from the switch fabric and transmit packets to the switch fabric. FPG 170 may be responsible for generating and receiving link pause and priority flow control (PFC) frames.

In the example shown in FIG. 3, NU 142 includes a forwarding block 172 to forward the packets coming from the fabric ports of FPG 170 and from the endpoint ports of source agent block 180. In the receive direction, FPG 170 or forwarding block 172 may have a flexible parser to parse incoming bytes and generate a parsed result vector (PRV). In the transmit direction, FPG 170 or forwarding block 172 may have a packet rewrite sub-unit to modify the outgoing packets based on the rewrite instructions stored with the packet or otherwise associated with the packet.

Forwarding block 172 may include a pipeline configured to process one PRV, received from FPG 170 and/or source agent block 180, every cycle. The forwarding pipeline of forwarding block 172 may include the following processing sections: attributes, ingress filter, packet lookup, nexthop resolution, egress filter, packet replication, and statistics.

In the attributes processing section, different forwarding attributes, such as virtual layer 2 interface, virtual routing interface, and traffic class, are determined. These forwarding attributes are passed to further processing sections in the pipeline. In the ingress filter processing section, a search key can be prepared from different fields of a PRV and searched against programmed rules. The ingress filter block can be used to modify the normal forwarding behavior using the set of rules. In the packet lookup processing section, certain fields of the PRV are looked up in tables to determine the nexthop index. The packet lookup block supports exact match and longest prefix match lookups.

In the nexthop resolution processing section, nexthop instructions are resolved and the destination egress port and the egress queue (or buffer) are determined. The nexthop resolution block supports different nexthops such as final nexthop, indirect nexthop, equal cost multipath (ECMP) nexthop, and weighted cost multipath (WCMP) nexthop. The final nexthop stores the information of the egress stream and how egress packets should be rewritten. The indirect nexthop may be used by software to embed an address of the nexthop in memory, which can be used to perform an atomic nexthop update.

In the egress filter processing section, packets are filtered based on the egress port and the egress queue. In most examples, the egress filter block cannot change the egress destination or egress queue, but can sample or mirror packets using the rule sets. If any of the processing stages has determined to create a copy of a packet, the packet replication block generates its associated data. NU 142 might create one extra copy of the incoming packet. The statistics processing section has a set of counters to collect statistics for network management purpose. The statistics block also supports metering to control packet rate to some of the ports or queues.

NU 142 also includes a packet buffer 174 to store packets for port bandwidth oversubscription. Packet buffer 174 may be used to store three kinds of packets: (1) transmit packets received from processing cores 140 on the endpoint ports of source agent block 180 to be transmitted to the fabric ports of FPG 170; (2) receive packets received from the fabric ports of FPG 170 to the processing cores 140 via the endpoint ports of destination agent block 182; and (3) transit packets coming on the fabric ports of FPG 170 and leaving on the fabric ports of FPG 170.

Packet buffer 174 keeps track of memory usage for traffic in different directions and priority. Based on a programmed profile, packet buffer 174 may decide to drop a packet if an egress port or queue is very congested, assert flow control to a work unit scheduler, or send pause frames to the other end. The key features supported by packet buffer 174 may include: cut-through for transit packets, weighted random early detection (WRED) drops for non-explicit congestion notification (ECN)-aware packets, ECN marking for ECN aware packets, input and output based buffer resource management, and PFC support.

Packet buffer 174 may have the following sub-units: one or more packet writers 191, packet memory 192, cell link list manager 193, packet queue manager 194, packet scheduler 195, packet reader 196, resource manager 197, and cell free pool 198. The packet writer 191 sub-unit collects flow control units (flits) coming from FPG 170, creates cells and writes to the packet memory 192 (e.g., enqueues network packets). To enqueue or buffer network packets, one or more packet writers 191 may store network packet data in record banks and/or store links in link banks and/or link stashes. In some examples, one or more packet writers 191 may perform eviction operations of link stashes (e.g., copy link information to the associated link bank, deallocate link stash memory, set the valid bit to invalid). The packet writer 191 sub-unit gets a Forwarding Result Vector (FRV) from forwarding block 172. The packet memory 192 sub-unit is a collection of memory banks. For example, packet memory 192 may be divided into record banks, link banks, and link stashes. In one example, the packet memory 192 is made of 16K cells with each cell having a size of 256 bytes made of four microcells each having a size of 64 bytes. In some examples, packet writer 191 may parse network packets to store the parsed network packets in one or more cells or microcells. Banks inside the packet memory 192 may be of 2Pp (1 write port and 1 read port) type. The packet memory 192 may have raw bandwidth of 1 Tbps write and 1 Tbps read bandwidth. FPG 170 has guaranteed slots to write and to read packets from the packet memory 192. The endpoint ports of source agent block 180 and destination agent block 182 may use the remaining bandwidth.

The cell link list manager 193 sub-unit within packet buffer 174 maintains a list of cells to represent packets. The cell link list manager 193 may be built of 1 write and 1 read port memory. The packet queue manager 194 sub-unit maintains a queue of packet descriptors for egress nodes. In some examples, the packet queue manager may read and write address information from a head pointer and/or from a tail pointer for the linked list used to implement the queue or buffer for network packet data. The packet scheduler 195 sub-unit schedules a packet based on different priorities among the queues. For example, the packet scheduler 195 may be a three-level scheduler: Port, Channel, Queues. In one example, each FPG port of FPG 170 has sixteen queues, and each endpoint port of source agent block 180 and destination agent block 182 has eight queues.

For scheduled packets, the packet reader 196 sub-unit within packet buffer 174 reads cells from packet memory 192 and sends them to FPG 170. In some examples, the first 64 bytes of the packet may carry rewrite information. The resource manager 197 sub-unit keeps track of usage of packet memory 192 for different pools and queues. The packet writer 191 consults the resource manager 197 to determine if a packet should be dropped. The resource manager 197 may be responsible to assert flow control to a work unit scheduler or send PFC frames to the ports. The cell free pool 198 sub-unit manages a free pool of packet buffer cell pointers. The cell free pool 198 allocates cell pointers when the packet writer 191 wants to write a new cell to the packet buffer memory, and deallocates cell pointers when the packet reader 196 dequeues a cell from the packet buffer memory.

NU 142 includes source agent control block 180 and destination agent control block 182 that, collectively, are responsible for FCP control packets. In other examples, source agent control block 180 and destination control block 182 may comprise a single control block. Source agent control block 180 generates FCP request messages for every tunnel. In response to FCP grant messages received in response to the FCP request messages, source agent block 180 instructs packet buffer 174 to send FCP data packets based on the amount of bandwidth allocated by the FCP grant messages. In some examples, NU 142 includes an endpoint transmit pipe (not shown) that sends packets to packet buffer 174. The endpoint transmit pipe may perform the following functions: packet spraying, packet fetching from memory 178, packet segmentation based on programmed MTU size, packet encapsulation, packet encryption, and packet parsing to create a PRV. In some examples, the endpoint transmit pipe may be included in source agent block 180 or packet buffer 174.

Destination agent control block 182 generates FCP grant messages for every tunnel. In response to received FCP request messages, destination agent block 182 updates a state of the tunnel and sends FCP grant messages allocating bandwidth on the tunnel, as appropriate. In response to FCP data packets received in response to the FCP grant messages, packet buffer 174 sends the received data packets to packet reorder engine 176 for reordering and reassembly before storage in memory 178. Memory 178 may comprise an on-chip memory or an external, off-chip memory. Memory 178 may comprise RAM, DRAM, SRAM, and/or single-entry flops, for instance. In some examples, NU 142 includes an endpoint receive pipe (not shown) that receives packets from packet buffer 174. The endpoint receive pipe may perform the following functions: packet decryption, packet parsing to create a PRV, flow key generation based on the PRV, determination of one of processing cores 140 for the incoming packet and allocation of a buffer handle in buffer memory, send the incoming FCP request and grant packets to destination agent block 182, and write the incoming data packets to buffer memory with the allocated buffer handle. In some examples, the queues or buffers, including record banks, link banks, and/or link stashes, head pointer, and/or tail pointer are stored in either of packet buffer 174 or memory 178.

Figure 4:
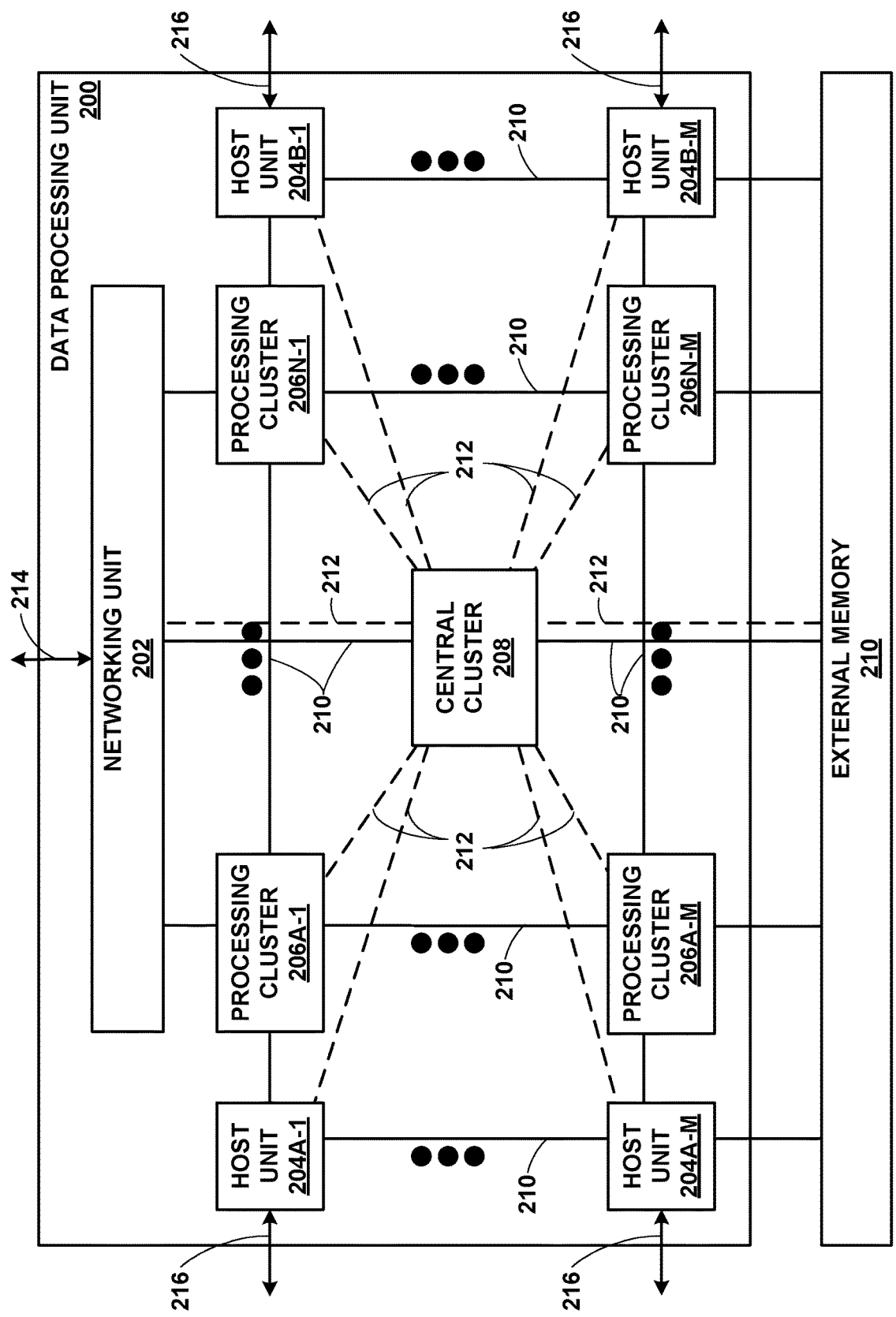
FIG. 4 is a block diagram illustrating one example of a DPU, in accordance with one or more aspects of the disclosure.

FIG. 4 is a block diagram illustrating one example of a data processing unit 200 including a networking unit, at least one host unit, and two or more processing clusters. Data processing unit 200 may operate substantially similar to any of DPUs 17 of FIG. 1. Thus, data processing unit 200 may be communicatively coupled to a data center fabric (e.g., switch fabric 14), one or more server devices (e.g., storage nodes 12 and/or compute nodes 13), storage media, one or more network devices, random access memory, or the like, e.g., via PCI-e, Ethernet (wired or wireless), or other such communication media in order to interconnect each of these various elements. Data processing unit 200 generally represents a hardware chip implemented in digital logic circuitry. As various examples, data processing unit 200 may be provided as an integrated circuit mounted on a motherboard of a computing device or installed on a card connected to the motherboard of the computing device.

In general, data processing unit 200 represents a high performance, hyper-converged network, storage, and data processor and input/output hub. As illustrated in FIG. 2, data processing unit 200 includes networking unit 202, host units 204A-1-204B-M (host units 204), processing clusters 206A-1-206N-M (processing clusters 206), and central cluster 208, and is coupled to external memory 210. Each of host units 204, processing clusters 206, central cluster 208, and networking unit 202 may include a plurality of processing cores, e.g., MIPS cores, ARM cores, PowerPC cores, RISC-V cores, or CISC or x86 cores. External memory 210 may comprise random access memory (RAM) or dynamic random-access memory (DRAM).

As shown in the example of FIG. 4, host units 204, processing clusters 206, central cluster 208, networking unit 202, and external memory 210 are communicatively interconnected via one or more specialized network-on-chip fabrics. A set of direct links 212 (represented as dashed lines in FIG. 4) forms a signaling network fabric that directly connects central cluster 208 to each of the other components of data processing unit 200, that is, host units 204, processing clusters 206, networking unit 202, and external memory 210. A set of grid links 210 (represented as solid lines in FIG. 4) forms a data network fabric that connects neighboring components (including host units 204, processing clusters 206, networking unit 202, and external memory 210) to each other in a two-dimensional grid.

Networking unit 202 may have Ethernet interfaces 214 to connect to the switch fabric, and interfaces to the data network formed by grid links 210 and the signaling network formed by direct links 212. Networking unit 202 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 202, which are coupled to respective grid links 210. The DMA engines of networking unit 202 are configured to fetch packet data for transmission. The packet data may be in on-chip or off-chip buffer memory (e.g., within buffer memory, including record banks, link banks, and/or link stashes, of one of processing clusters 206 or external memory 210), or in host memory. In some examples, head pointer, and/or tail pointer are stored in one of processing clusters 206 or external memory 210.

Host units 204 may each have PCI-e interfaces 216 to connect to servers and/or storage devices, such as SSDs or HDDs. This may allow data processing unit 200 to operate as an endpoint or as a root. For example, data processing unit 200 may connect to a host system (e.g., a server) as an endpoint device, and data processing unit 200 may connect as a root to endpoint devices (e.g., SSD devices). Each of host units 204 may also include a respective hardware direct memory access (DMA) engine (not shown). Each DMA engine is configured to fetch data and buffer descriptors from host memory, and to deliver data and completions to host memory.

Although not shown, each of central cluster 208 and processing clusters 206 may include two or more processing cores and two or more hardware accelerators. In general, hardware accelerators perform acceleration for various data-processing functions, such as look-ups, matrix multiplication, cryptography, compression, regular expressions, or the like. That is, the hardware accelerators may comprise hardware implementations of lookup engines, matrix multipliers, cryptographic engines, compression engines, regular expression interpreters, or the like. The hardware accelerators may also perform acceleration for additional data reduction techniques beyond compression, including erasure coding and, in some cases, deduplication and thin provisioning.

Data processing unit 200 provides optimizations for stream processing. Data processing unit 200 executes an operating system that provides run-to-completion processing, which may eliminate interrupts, thread scheduling, cache thrashing, and associated costs. For example, an operating system may run on one or more of processing clusters 206. Central cluster 208 may be configured differently from processing clusters 206, which may be referred to as stream processing clusters. In general, central cluster 208 executes the operating system kernel (e.g., Linux kernel) as a control plane. Processing clusters 206 may function in run-to-completion thread mode of a data plane software stack of the operating system. That is, processing clusters 206 may operate in a tight loop fed by work unit queues associated with each processing core in a cooperative multi-tasking fashion.

Data processing unit 200 operates on work units. Work units are sets of data exchanged between processing clusters 206, networking unit 202, host units 204, central cluster 208, and external memory 210. Work units may associate a buffer with an instruction stream to eliminate checking overhead and allow processing by reference to minimize data movement and copy. The stream-processing model may structure access by multiple processors (e.g., processing clusters 206) to the same data and resources, avoid simultaneous sharing, and therefore, reduce contention. A processor may relinquish control of data referenced by a work unit as the work unit is passed to the next processor in line. Central cluster 208 may include a central dispatch unit responsible for work unit queuing and flow control, work unit and completion notification dispatch, and load balancing and processor selection from among processing cores of processing clusters 206 and/or central cluster 208. Software that executes on one of processing clusters or central cluster 208 to implement a work unit is referred to herein as a work unit handler (WUH). More details on work units and stream processing by access nodes are available in U.S. Provisional Patent Application No. 62/589,427, filed Nov. 21, 2017, entitled "Work Unit Stack Data Structures in Multiple Core Processor System."

One or more of processing clusters 206 of data processing unit 200 may host a data plane for performing data storage operations on a durable block device (DBD) that provides persistent storage of data blocks with inline erasure coding enabled by the hardware accelerators of processing clusters 206. Management and control planes of the DBD may be hosted on one or more servers connected to data processing unit 200 via host units 204 or via networking unit 202. The data plane of the DBD hosted on the one or more of processing clusters 206 may communicate with the management plane and the control plane via a management agent and a control agent, respectively, hosted on central cluster 208 of data processing unit 200.

The data plane of the DBD hosted on the one or more of processing clusters 206 of data processing unit 200 may be divided into multiple layers of functionality from application (e.g., user volume) to device (e.g., SSD storage device). The data plane may include a log structured logical volume layer of the DBD that may enable performance of inline erasure coding.

The data plane of the DBD hosted on the one or more of processing clusters 206 of data processing unit 200 handles the workload of responding to data block read and write requests received via host units 204 from applications running on the servers. For example, when a write request for a hosted volume is received on one of PCI-e interfaces 216 of host units 204 from an application running on one of the servers, the receiving one of host units 204 generates a work unit to one of processing clusters 206. In response to the work unit, the one of processing clusters 206 performs the write request to the appropriate volume hosted by data processing unit 200. To perform the write request, the one of processing clusters 206 may propagate the work unit (or multiple work units) through the multiple functional layers of the storage stack, which may be hosted on a different one of processing clusters 206 of data processing unit 200 or on different access nodes.

The control and management agents running on central cluster 208 of data processing unit 200 facilitate communication between the data plane of the DBD hosted on data processing unit 200 and the control and management planes of the DBD running on the servers. In general, the number of control and management agents is a very small fraction (e.g., 1%) of the number of data plane entities hosted on access nodes. As one example, central cluster 208 of data processing unit 200 may host a single control agent and a single management agent, while processing clusters 206 may host data planes for hundreds of DBD user volumes. Conversely, in other examples, central cluster 208 of data processing unit 200 may host multiple control and management agents as a larger fraction (e.g., 25% or 50%) of the number of data planes hosted on processing clusters 206, or even in a one-to-one relationship between control and management agents and data planes.

Data processing units 17 may store data in and retrieve data from a key-value store. From an API perspective, the key-value store is a type of access method in addition to Block access methods for directly storing and reading blocks of data. Both the key-value store and the Block access methods may be part of a set of control plane commands used to configure storage resources. From an implementation perspective, the key-value store may use devices that use block access methods for storing data objects (e.g., a directory, a large value store, etc.).

In the key-value store, discrete pieces of data (i.e., a value) are associated with corresponding keys. An access node may use the key associated with a value to retrieve the value. In general, a key is an identifier (e.g., number, string of bits, string of alphanumeric values, etc.). In some examples, a key is smaller in size than the value associated with the key. Various types of values may be stored in a key-value store. For examples, the values may include pictures, videos, authentication credentials, webpage data, programming scripts, virtual machine images, documents, or other types of data.

In the example of FIG. 4, DPU 200 may receive the client operations via network packets received by networking unit 202. Networking unit 202 may forward the network packets to central cluster 208, which may either redirect the client operation via networking unit 202 to a responsible one of DPUs 17 or forward the network packets to processing clusters 206 for processing the client operations for objects owned by DPU 200.

Each of processing clusters 206 may be configured to perform various aspects of the techniques described in this disclosure. For example, processing clusters 206 may enqueue, buffer, parse, process, and/or modify received network packets as described in this disclosure. To enqueue or buffer network packets, the processing clusters 206 may store network packet data in record banks and/or store links in link banks and/or link stashes.

In some examples, processing clusters 206 may perform eviction operations of link stashes (e.g., copy link information to the associated link bank, deallocate link stash memory, set the valid bit to invalid). Processing clusters 206 may also perform dequeue operations on network packets from the queue or buffer (e.g., to route them out of an egress port). For example, processing clusters 206 may obtain a head address from the head pointer corresponding to an address in a first record bank and read the network packet data from the obtained head address at the first record bank.

The processing clusters 206 may read and write address information from a head pointer and/or from a tail pointer for the linked list used to implement the queue or buffer for network packet data. In some examples, the processing clusters 206 may read the link stored at the head address of a first link bank corresponding to the first record bank or from a first link stash corresponding to the first record bank and set the head pointer to the target address in the link read from the first link bank or the first link stash. In some examples, when reading a link, the reader consults the link stash associated with the link bank at the index associated with the list. If the entry is valid and its address matches the address being read (e.g., the head address), then the link from the entry is returned, and, if this is the last time the reader will read this link, the entry is also made invalid. Otherwise, if the entry is invalid or the address does not match the desired address, then the link is read from the link bank at the desired instead.

Figure 5:
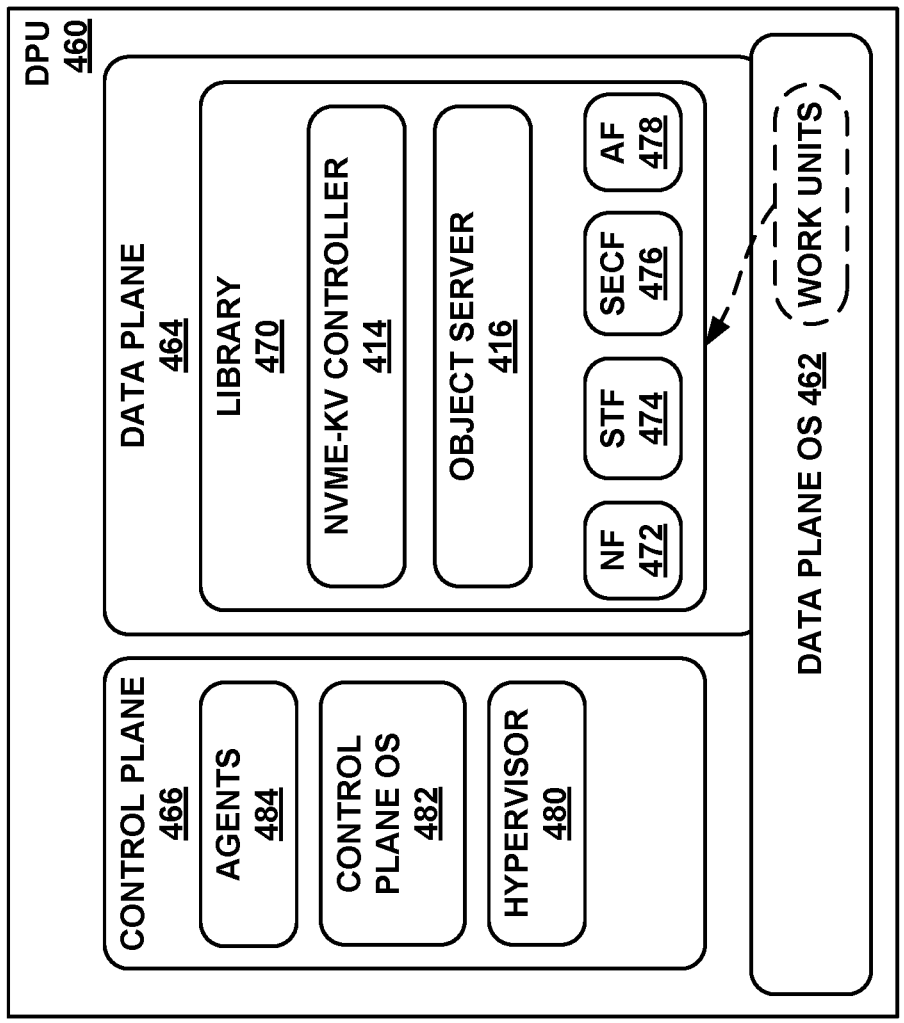
FIG. 5 is a block diagram illustrating an example system that may be configured to perform various aspects of the techniques described in this disclosure.

FIG. 5 is a block diagram illustrating an example DPU 460 that may be configured to perform various aspects of the techniques described in this disclosure. DPU 460 may represent one example of any of the DPUs described throughout this disclosure, and may include a run-to-completion data plane operating system (OS) 462 configured to process work units. DPU 460 generally represents a hardware chip implemented in digital logic circuitry. As noted above, DPU 460 is a highly programmable I/O processor with a plurality of processing cores (as discussed above). In the illustrated example of FIG. 5, DPU 460 includes a network interface (e.g., an Ethernet interface) to connect directly to a network, and a plurality of host interfaces (e.g., PCI-e interfaces) to connect directly to one or more application processors and one or more storage devices (e.g., SSDs).

DPU 460 also includes a run-to-completion data plane operating system (OS) 462 executing on two or more of the plurality of processing cores. Data plane OS 462 provides data plane 464 as an execution environment for a run-tocompletion software function invoked on data plane OS 462 to process a work unit. The work unit is associated with one or more stream data units (e.g., packets of a packet flow), and specifies the software function for processing the stream data units and one of the plurality of processing cores for executing the software function.

The software function invoked to process the work unit may be one of a plurality of software functions for processing stream data included in a library 470 provided by data plane OS 462. In the illustrated example, library 470 includes network functions (NF) 472, storage functions (STF) 474, security functions (SECF) 476, and analytics functions (AF) 478. Network functions 472 may, for example, include network I/O data processing functions related to Ethernet, network overlays, networking protocols, encryption, and firewalls. Storage functions 474 may, for example, include storage I/O data processing functions related to NVME (non-volatile memory express), compression, encryption, replication, erasure coding, and pooling. Security functions 476 may, for example, include security data processing functions related to encryption, regular expression processing, and hash processing. Analytics functions 478 may, for example, include analytical data processing functions related to a customizable pipeline of data transformations.

In general, data plane OS 462 is a low level, run-to-completion operating system running on bare metal of DPU 460 that runs hardware threads for data processing and manages work units. As described in more detail below, data plane OS 462 includes the logic of a queue manager to manage work unit interfaces, enqueue and dequeue work units from queues, and invoke a software function specified by a work unit on a processing core specified by the work unit. In the run-to-completion programming model, data plane OS 462 is configured to dequeue a work unit from a queue, process the work unit on the processing core, and return the results of processing the work unit to the queues.

DPU 460 also includes a multi-tasking control plane operating system executing on one or more of the plurality of processing cores. In some examples, the multi-tasking control plane operating system may comprise Linux, Unix, or a special-purpose operating system. In some examples, data plane OS 462 provides a control plane 466 including a control plane software stack executing on data plane OS 462. As illustrated, the control plane software stack includes a hypervisor 480, a multi-tasking control plane 4OS 82 executing within an execution environment provided by hypervisor 480, and one or more control plane service agents 484 executing on control plane OS 482.

Hypervisor 480 may operate to isolate control plane OS 482 from the work unit and data processing performed on data plane OS 462. Control plane service agents 484 executing on control plane OS 482 comprise application level software configured to perform set up and tear down of software structures to support work unit processing performed by the software function executing on data plane OS 462. In the example of data packet processing, control plane service agents 484 are configured to set up the packet flow for data packet processing by the software function on data plane OS 462, and tear down the packet flow once the packet processing is complete. In this way, DPU 460 comprises a highly programmable processor that can run application level processing while leveraging the underlying work unit data structure for highly parallelized stream processing.

In another example, instead of running on top of data plane OS 462, the multi-tasking control plane operating system may run on one or more independent processing cores that are dedicated to the control plane operating system and different than the processing cores executing data plane OS 462. In this example, if an independent processing core is dedicated to the control plane operating system at the hardware level, a hypervisor may not be included in the control plane software stack. Instead, the control plane software stack running on the independent processing core may include the multi-tasking control plane operating system and one or more control plane service agents executing on the control plane operating system.

Data plane OS 462 of DPU 460 is configured to receive stream data units for processing. In the example of packet processing, the stream data units may comprise data packets of packet flows. In this example, the received packet flows may include any of networking packet flows, storage packet flows, security packet flow, analytics packet flows, or any combination thereof. Data plane OS 462 executing on one of the processing cores of DPU 460 may receive each of the packet flows in the form of one or more work units from a networking unit, host unit, or another one of the processing cores of DPU 460. Each of the work units for a received packet flow may be associated with one or more data packets of the packet flow.

In some examples, data plane OS 462 may execute a queue manager configured to receive a work unit associated with one or more data packets of the packet flow, enqueue the work unit to a work unit queue associated with the processing core for the packet flow, dequeue the work unit from the work unit queues to the processing core, and invoke the software function specified by the work unit on the processing core for processing the work unit.

Data plane OS 462 also provides interfaces to one or more hardware accelerators of DPU 462 configured to perform acceleration for various data processing functions. Data plane OS 462 may use the hardware accelerators to process one or more portions of the packet flow, i.e., one or more work units, arranged as a work unit (WU) stack. In the WU stack, a first work unit includes an identifier of a subsequent work unit within the WU stack for further processing of the packets upon completion of the first work unit. To perform stream processing for the packet flow, a hardware accelerator is configured to perform one or more hardware commands included in the WU stack as input parameters of the first work unit, and upon completion of the one or more hardware commands, proceed to the subsequent work unit within the WU stack identified by the first work unit.

Data plane OS 462 configured to perform various aspects of the techniques described in this disclosure. For example, data plane OS 462 may enqueue, buffer, parse, process, and/or modify received network packets as described in this disclosure. To enqueue or buffer network packets, data plane OS 462 may store network packet data in record banks and/or store links in link banks and/or link stashes.

In some examples, data plane OS 462 may perform eviction operations of link stashes (e.g., copy link information to the associated link bank, deallocate link stash memory, set the valid bit to invalid). Data plane OS 462 may also perform dequeue operations on network packets from the queue or buffer (e.g., to route them out of an egress port). For example, data plane OS 462 may obtain a head address from the head pointer corresponding to an address in a first record bank and read the network packet data from the obtained head address at the first record bank.

Data plane OS 462 may read and write address information from a head pointer and/or from a tail pointer for the linked list used to implement the queue or buffer for network packet data. In some examples, data plane OS 462 may read the link stored at the head address of a first link bank corresponding to the first record bank or from a first link stash corresponding to the first record bank and set the head pointer to the target address in the link read from the first link bank or the first link stash. In some examples, when reading a link, the reader consults the link stash associated with the link bank at the index associated with the list. If the entry is valid and its address matches the address being read (e.g., the head address), then the link from the entry is returned, and, if this is the last time the reader will read this link, the entry is also made invalid. Otherwise, if the entry is invalid or the address does not match the desired address, then the link is read from the link bank at the desired instead.

Figure 6A:
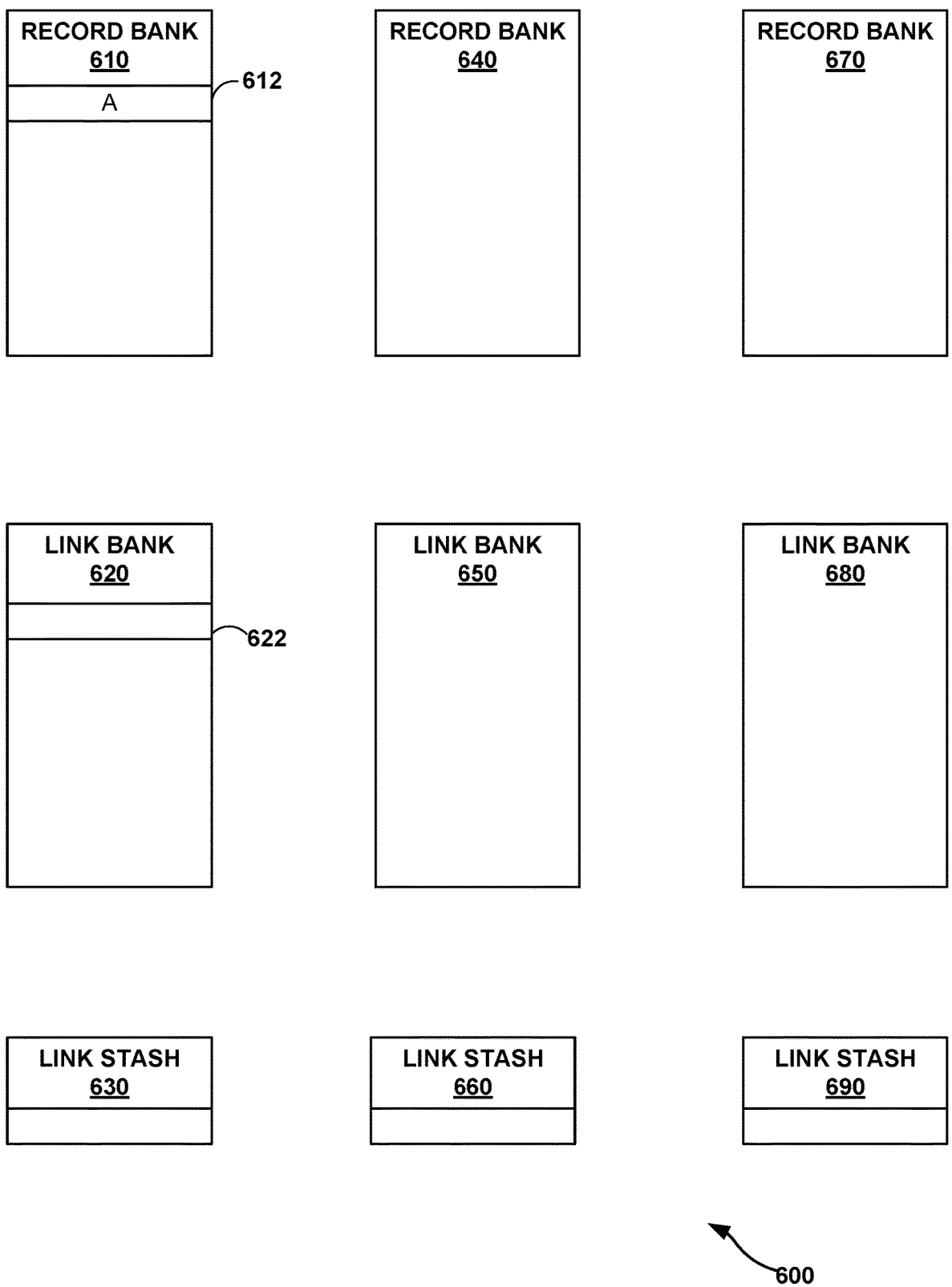
FIGS. 6A-6G illustrate example data structures in accordance with one or more techniques of this disclosure.

FIGS. 6A-6G illustrate example data structures 600 in accordance with one or more techniques of this disclosure. FIG. 6A shows record bank 610 and corresponding link bank 620 and link stash 630, record bank 640 and corresponding link bank 650 and link stash 660, and record bank 670 and corresponding link bank 680 and link stash 690. In some examples, record banks 610, 640, and 670, link banks 620, 650, and 680, and link stashes 630, 660, and 690 may be stored in the same pool of memory (e.g., coherent cache memory 136 or non-coherent buffer memory 138 of FIG. 2, packet buffer 174 or memory 178 of FIG. 3, and/or processing clusters 206 or external memory 210 of FIG. 4).

Each of record banks 610, 640, and 670 may be configured store one or more network packets (or one or more portions of one or more network packets). In some examples, the record banks are implemented using single-port static random-access memories (SRAMs). Each of link bank 620, 660, and 680 may be configured to store links between network packets (or portions of network packets) stored in different record banks. For example, link bank 620 can be configured to store a link comprising a pointer from an address in record bank 610 to a target address in record bank 640 or in record bank 670. The addresses corresponding to entries (e.g., records) stored in the record banks can correspond (e.g., be the same) as the addresses corresponding to the entries (e.g., links) stored in the link banks. In this way, the link banks may only store the target address because the address where that target address is stored corresponds (e.g., is the same) as the address of where the record (e.g., network packer or portion thereof) is stored in the record bank. In some examples, the link banks are implemented using single-port SRAMs.

Each of link stashes 630, 660, and 690 may be configured to store a valid bit (e.g., to indicate where the entry in the link stash is valid) and a link between network packets (or portions of network packets) stored in different record banks (e.g., the same links that can be stored in a link bank). Rach stash entry may hold a valid bit, a local bank address, and a link. For example, link stash 630 can be configured to store a link comprising a pointer from an address in record bank 610 (e.g., a current address) to a target address in record bank 640 or in record bank 670. Link stash 630 may be configured to store a valid bit (e.g., to indicate where the entry in the link stash is valid), the current address in the corresponding link bank (e.g., the location in the link bank to which the entry should have been written, which may be the same as the address at which the record was written) and the target address to another record bank entry. In some examples, the link stashes are implemented using single entry flops. In certain examples, each link stash is directly indexed with one entry per list. In some examples, each link stash is associated with an index of a link bank.

In order to allow N writers and one reader concurrent access to memory, both record and link memory may be split into a minimum of N+1 (or more) single-port banks (e.g., corresponding to an egress port). In this way, a reader may read from the record and link bank containing the head of the linked list and each writer can write its record to any of the remaining N record banks such that no two writers write to the same record bank (and there is at least one free entry in each bank). While FIGS. 6A-6G illustrate three sets of record banks, link banks, and link stashes to support at least two concurrent writers and a concurrent reader (e.g., to avoid writer-writer and/or reader-writer collisions), it should be understood that any number of record banks, link banks, and link stashes sets can be used to support additional writers or readers. For example, to support at least 10 writers and one reader, eleven (or more) sets of record banks, link banks, and link stashes may be used.

Figure 6B:
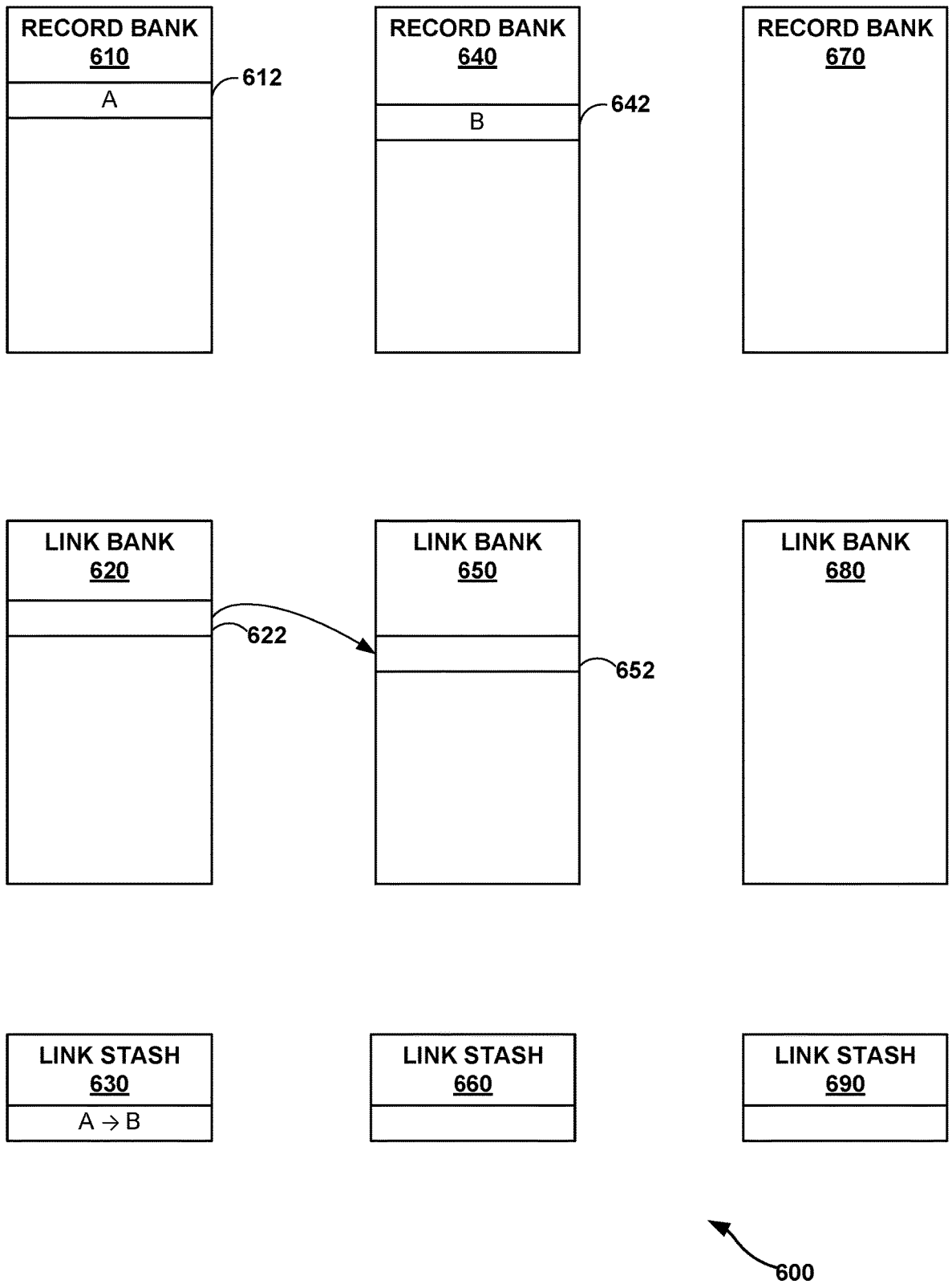

FIG. 6A illustrates data structures 600 after network packet A (or some portion of a network packet) was written (e.g., enqueued) to record bank 610 at address 612. In this example, the head pointer (not shown) and the tail pointer (not shown) are both referencing address 612 because only one network packet is stored in the linked list implementing the queue or buffer. FIG. 6B illustrates data structures 600 after network packet B (or some portion of a network packet) was written to record bank 640 at address 642. FIG. 6B also shows that a link from network packet A to network packet B (A→B) is stored in link stash 630 (e.g., the link stash corresponding to the record bank that was previously written to). A writer sets a valid bit (not shown) of link stash 630 to valid (e.g., 1, TRUE, or any other value). In some examples, link (A→B) comprises address 612 or address 622 (e.g., the current or origin address) and target address 642 or 652. In some examples, addresses 612 and 622 are the same. In some examples, addresses 642 and 652 are the same. In some examples, the tail pointer is updated to reference address 642, the new tail of the linked list implementing the queue or buffer. Network packets A and B can be written by two different writers in the same processing cycle or in different processing cycles.

Figure 6C:
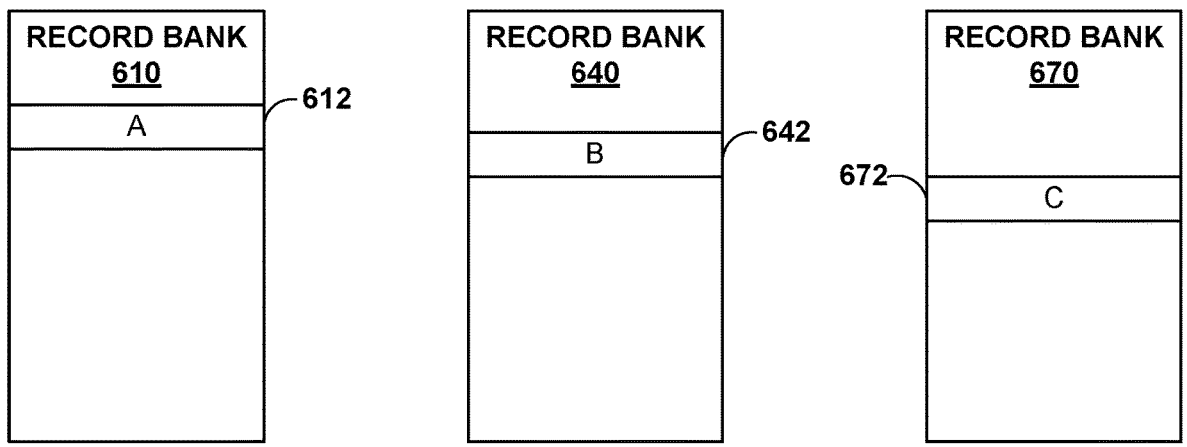
Figure 6C:
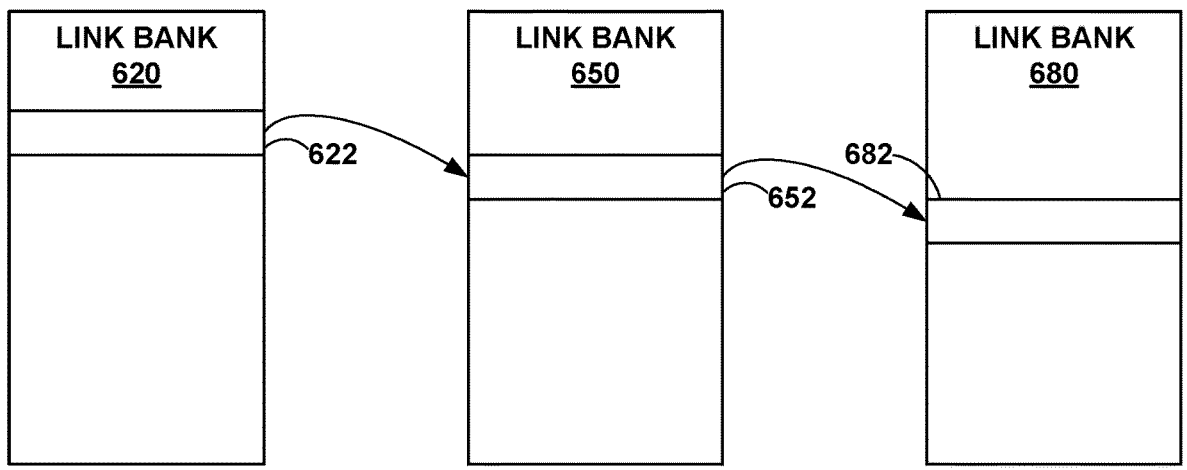
Figure 6C:
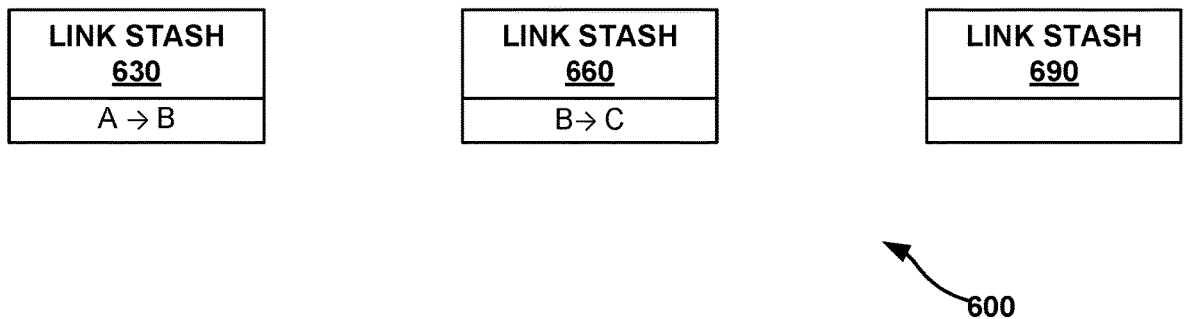

FIG. 6C illustrates data structures 600 after network packet C (or some portion of a network packet) was written to record bank 670 at address 672. FIG. 6C also shows that a link from network packet B to network packet C (B→C) is stored in link stash 660 (e.g., the link stash corresponding to the record bank that was previously written to). A writer may set a valid bit (not shown) of link stash 660 to valid (e.g., 1, TRUE, or any other value). In some examples, link (B→C) comprises address 642 or address 652 (e.g., the current or origin address) and target address 672 or 682. In some examples, addresses 642 and 652 are the same. In some examples, addresses 672 and 682 are the same. A DPU may update the tail pointer to reference address 672, the new tail of the linked list implementing the queue or buffer.

Figure 6D:
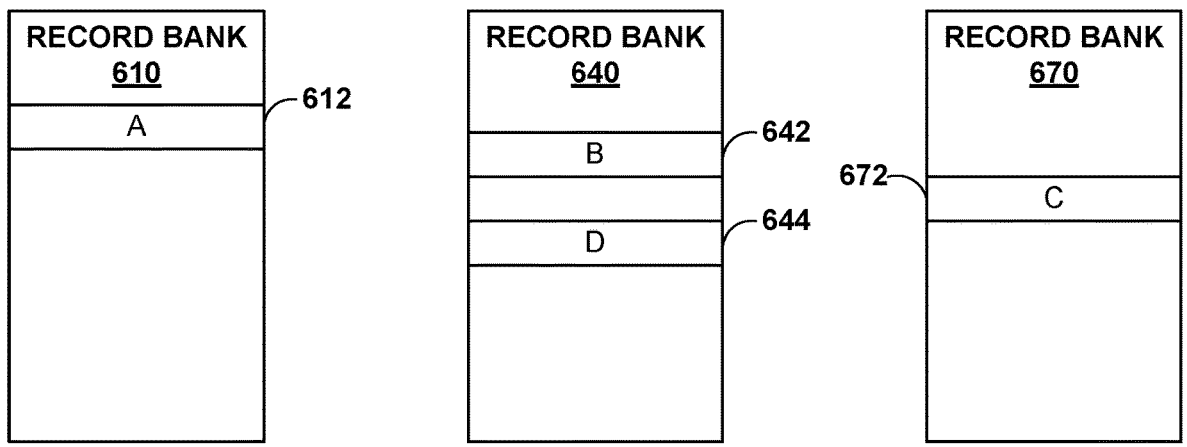
Figure 6D:
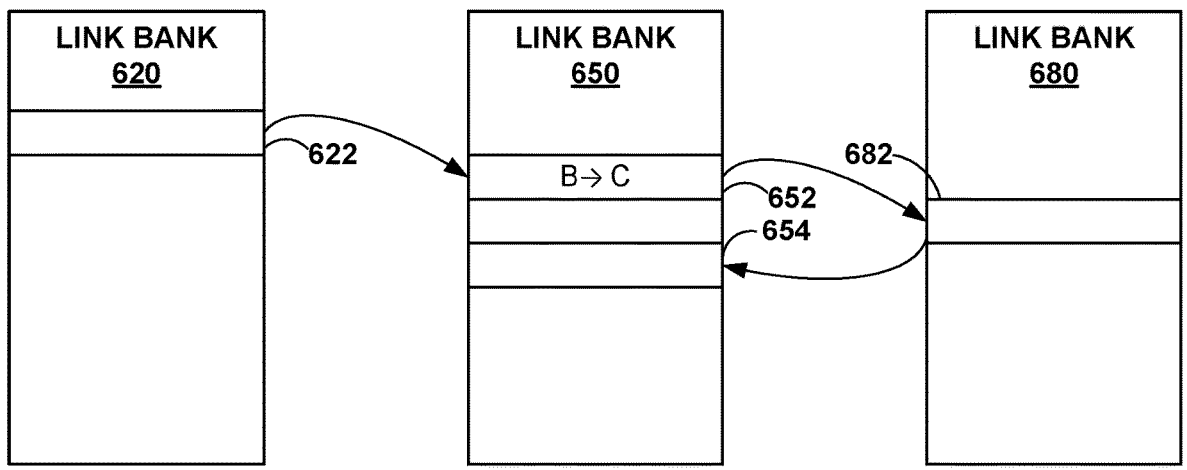
Figure 6D:
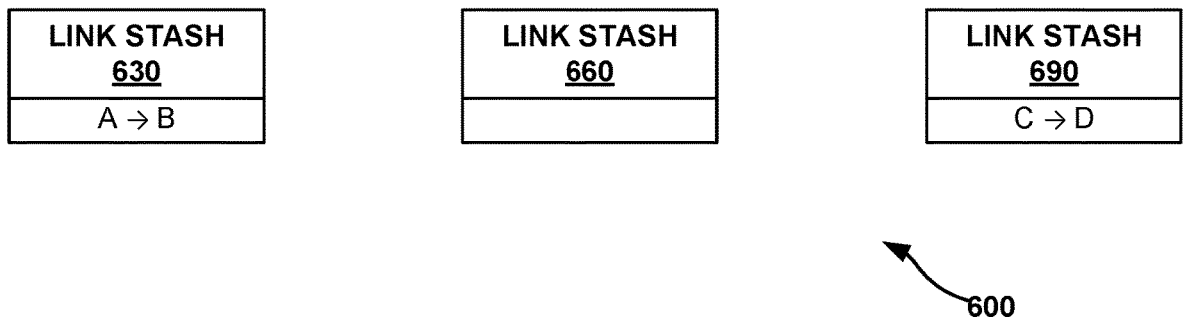

FIG. 6D illustrates data structures 600 after network packet D (or some portion of a network packet) was written to record bank 640 at address 644. FIG. 6D also shows that a link from network packet C to network packet D (C→D) is stored in link stash 690 (e.g., the link stash corresponding to the record bank that was previously written to). A writer may set a valid bit (not shown) of link stash 690 to valid (e.g., 1, TRUE, or any other value). Link (C→D) may comprise address 672 or address 682 (e.g., the current or origin address) and target address 644 or 654. In some examples, addresses 672 and 682 are the same. In some examples, addresses 644 and 654 are the same. A writer may update the tail pointer to reference address 644, the new tail of the linked list implementing the queue or buffer. A writer may evict link stash 660 when the writer writes network packet D to record bank 640. For example, a writer may evict the link stash 660 by setting the valid bit (not shown) to invalid (e.g., 0, NULL, FALSE, or any other value), storing (e.g., copying) link (B→C) contained in link stash 660 to address 652 of link bank 650 (e.g., to preserve the link), and/or deallocating the memory of link stash 660. In some examples, address 652 is obtained from link (B→C) (e.g., the current or origin address). In some examples, the link stash 660 is evicted in response to the writer determining that the entry in link stash 660 is valid (e.g., in response to determining that the value of the valid bit is 1, TRUE, or any other value other than 0, NULL, or FALSE). Evicting link stash 660 allows another writer to store another link in link stash 660 when the writer enqueues another network packet.

Figure 6E:
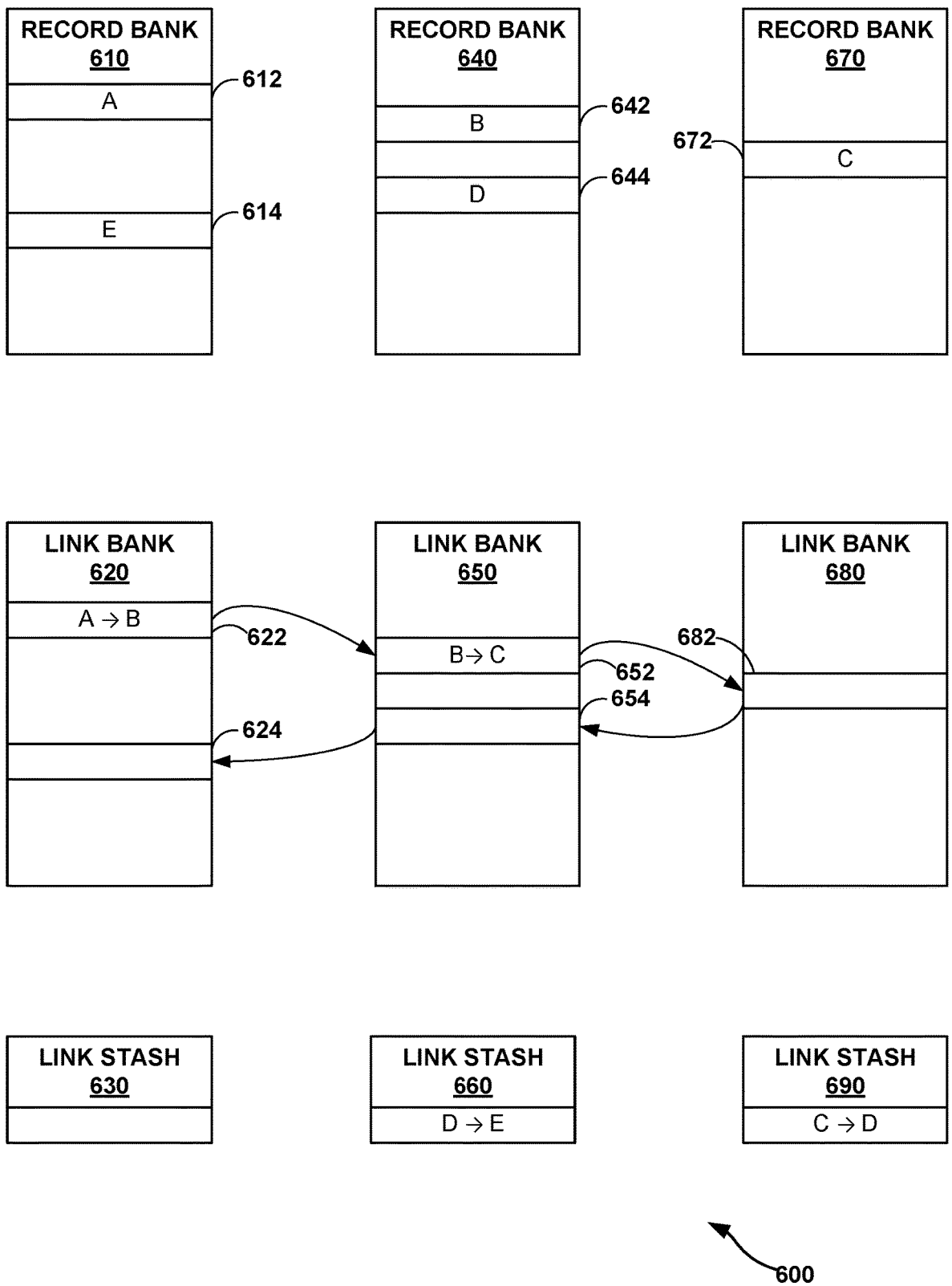

FIG. 6E illustrates data structures 600 after network packet E (or some portion of a network packet) was written to record bank 610 at address 614. FIG. 6E also shows that a link from network packet D to network packet E (D→E) is stored in link stash 660 (e.g., the link stash corresponding to the record bank that was previously written to). A writer may set a valid bit (not shown) of link stash 660 to valid (e.g., 1, TRUE, or any other value). In some examples, link (D→E) comprises address 644 or address 654 (e.g., the current or origin address) and target address 614 or 624. In some examples, addresses 644 and 654 are the same. In some examples, addresses 614 and 644 are the same. A writer may update the tail pointer to reference address 614, the new tail of the linked list implementing the queue or buffer. In some examples, writer may evict link stash 630 when the writer writes network packet E to record bank 610. For example, a writer may evict the link stash 630 by setting the valid bit (not shown) to invalid (e.g., 0, NULL, FALSE, or any other value), storing (e.g., copying) link (A→B) contained in link stash 630 to address 622 of link bank 620 (e.g., to preserve the link), and/or deallocating the memory of link stash 630. In some examples, address 622 is obtained from link (A→B) (e.g., the current or origin address). In some examples, the link stash 630 is evicted in response to the writer determining that the entry in link stash 660 is valid (e.g., in response to determining that the value of the valid bit is 1, TRUE, or any other value other than 0, NULL, or FALSE). Evicting link stash 630 allows another writer to store another link in link stash 660 when the writer enqueues another network packet.

Figure 6F:
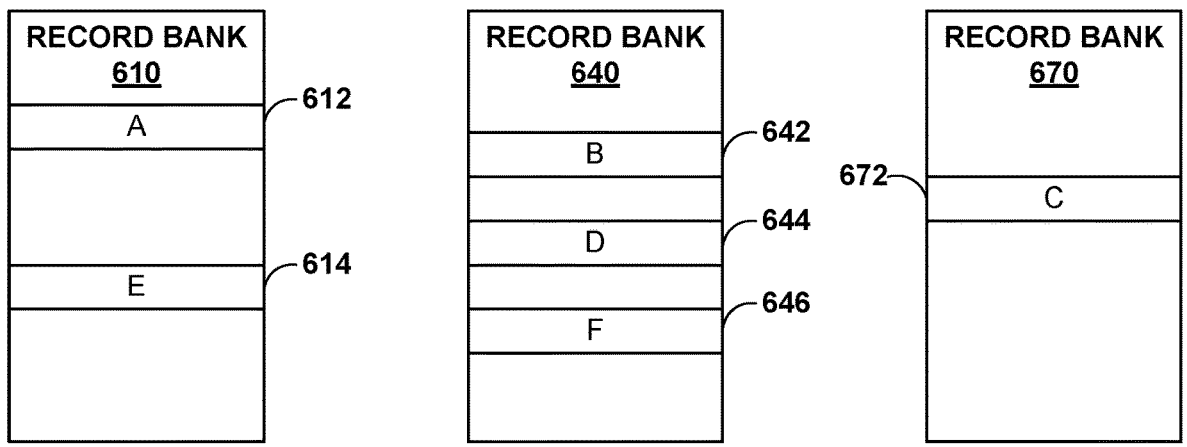
Figure 6F:
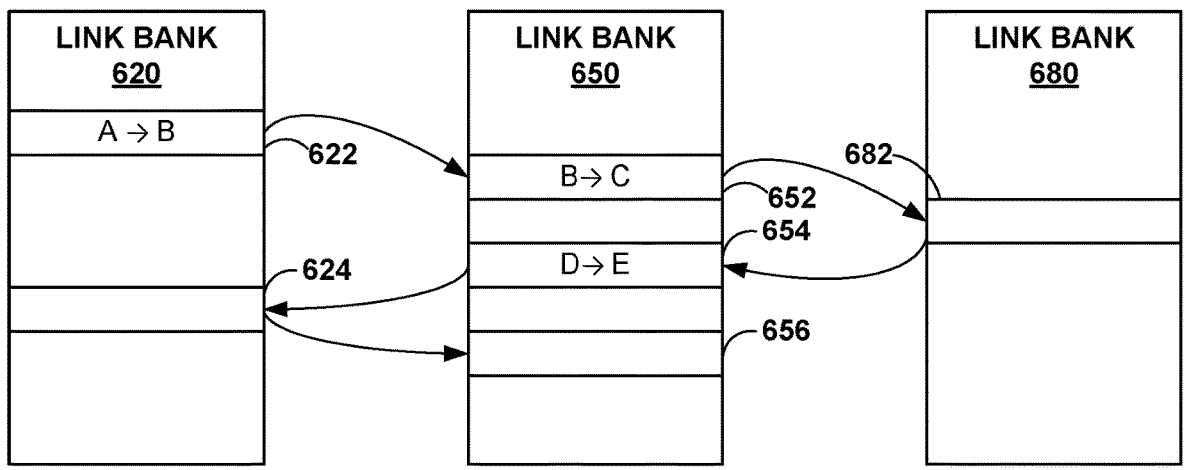
Figure 6F:
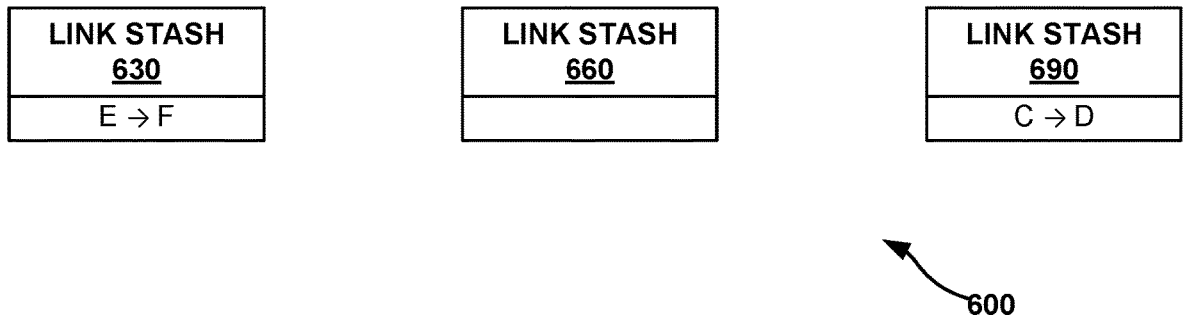

FIG. 6F illustrates data structures 600 after network packet F (or some portion of a network packet) was written to record bank 640 at address 646. FIG. 6F also shows that a link from network packet E to network packet F (E→F) is stored in link stash 660 (e.g., the link stash corresponding to the record bank that was previously written to). A writer may set a valid bit (not shown) of link stash 630 to valid (e.g., 1, TRUE, or any other value). Link (E→F) may comprise address 614 or address 624 (e.g., the current or origin address) and target address 646 or 656. In some examples, addresses 614 and 624 are the same. In some examples, addresses 646 and 656 are the same. A DPU may update the tail pointer to reference address 646, the new tail of the linked list implementing the queue or buffer.

A writer may evict link stash 660 when the writer writes network packet F to record bank 640. For example, a writer may evict the link stash 660 by setting the valid bit (not shown) to invalid (e.g., 0, NULL, FALSE, or any other value), storing (e.g., copying) link (D→E) contained in link stash 630 to address 622 of link bank 620 (e.g., to preserve the link), and/or deallocating the memory of link stash 660. In some examples, address 644 is obtained from link (D→E) (e.g., the current or origin address). In some examples, the link stash 660 is evicted in response to the writer determining that the entry in link stash 660 is valid (e.g., in response to determining that the value of the valid bit is 1, TRUE, or any other value other than 0, NULL, or FALSE). Evicting link stash 660 allows another writer to store another link in link stash 660 when the writer enqueues another network packet.

As described above, multiple writers can push data to the same linked list (e.g., queue o buffer) at the same time (e.g., concurrently). When multiple writers enqueue to the same linked list implementing the queue or buffer, the enqueues must appear to have occurred in some order. In some examples, the writers are assigned an order number such that the lowest numbered writer will appear to have pushed (e.g., enqueued) first and the highest numbered writer will appear to have pushed (e.g., enqueued) last. In some examples, the first writer writes its link to the link memory address associated with the record at the tail of the list. Subsequent writers in the same cycle write their link to the link memory address associated with the record of the writer that comes immediately before them in the order. The address of the last writer's record in the cycle becomes the new tail of the list. For example, table 1 below shows write active to the same linked list implementing the queue or buffer over two cycles (t−1 and t). In cycle t−1, the tail record was written to bank 0. In cycle t, 4 writers—ordered as writer 0 through writer 3—write records to banks 1, 2, 3, and 4.

TABLE 1

| Cycle | t-1 | t | | | |
|---|---|---|---|---|---|
| Writer Order | — | 0 | 1 | 2 | 3 |
| Record Bank | 0 | 1 | 2 | 3 | 4 |
| Link Bank | — | 0 | 1 | 2 | 3 |
| Link Write | — | Stash - Bank 0 | Direct - Bank 1 | Direct - Bank 2 | Direct - Bank 3 |
| Stash Evict | — | No | No | No | Yes - Bank 4 |

In the table above, each writer also writes a link to the bank corresponding to the previous record. With the exception of the first writer in a cycle, all subsequent writers have exclusive access to their link bank because the previous writer has exclusive access to the corresponding record bank, so they can write their links directly to the link banks. In this example, however, the first writer does not have exclusive access to its link bank, so it writes its link to the stash associated with the link bank in order to avoid a collision. In some examples, only the first writer in a cycle writes to a link stash. In some examples, a direct-write occurs when the previous writer writes to the corresponding record bank—the record bank to which the writer has exclusive access. The last writer does not have a subsequent writer that will use the link bank associated with its record bank, so the last writer in the example table above can evict the stash entry for the list from that bank. In certain examples, a stash eviction occurs only in the link bank corresponding to the record bank of the same writer, but only when there is no direct write to that link bank. In some examples, a stash entry will not overwrite a valid stash entry because, in the previous cycle, either the last writer evicted the stash entry (e.g., made the entry invalid), or the stash entry was already invalid for the first writer to use, but the first writer did not write to the link stash (leaving the entry invalid).

Table 2 below shows the same scenario as table 1, but, in this example, the last writer's (writer 3 in cycle t) record bank is now the same as the first writer's (writer 0 in cycle t) link bank. In this case, the first writer (writer 0 in cycle t) now has exclusive access to link bank 0, and can write its link directly; however, this means that the last writer (writer 3 in cycle t) does not have access to link bank 0 and cannot evict a stash entry.

TABLE 2

| Cycle | t-1 | t | | | |
|---|---|---|---|---|---|
| Writer Order | — | 0 | 1 | 2 | 3 |
| Record Bank | 0 | 1 | 2 | 3 | 0 |
| Link Bank | — | 0 | 1 | 2 | 3 |
| Link Write | — | Direct - Bank 0 | Direct - Bank 1 | Direct - Bank 2 | Direct - Bank 3 |
| Stash Evict | — | No | No | No | No |

Table 3 below shows an example of a single writer, which is both the first and last writer. In this example, the record and link banks are different, so it must write the link to the stash bank associated with the link bank and evict an entry from the stash associated with the record bank. This is no different than the behavior for multiple writers.

TABLE 3

| Cycle | t-1 | t |
|---|---|---|
| Writer Order | — | 0 |
| Record Bank | 0 | 1 |
| Link Bank | — | 0 |
| Link Write | — | Stash - Bank 0 |
| Stash Evict | — | Yes - Bank 1 |

Table 4 shows an example of a single writer, where the record and link banks are the same. In this example, the writer writes the link directly to link bank 0 and does not evict a stash entry.

TABLE 4

| Cycle | t-1 | t |
|---|---|---|
| Writer Order | — | 0 |
| Record Bank | 0 | 0 |
| Link Bank | — | 0 |
| Link Write | — | Direct - Bank 0 |
| Stash Evict | — | No |

To group writers by bank, and to establish an order in which they appear to write to the linked list implementing the queue or buffer (e.g., when writing in the same processing cycle), each writer's bank number must be compared to the bank numbers of the others. The comparators can be arranged in a matrix, as shown in Table 5. The diagonal is implicitly all 1's (every writer's bank is equal to itself). Each "==" cell represents the result of comparing the list numbers associated with the writers identified in the row and column headings.

TABLE 5

| W | 0 | 1 | 2 | 3 |
|---|---|---|---|---|
| 0 | 1 | | | |
| 1 | == | 1 | | |
| 2 | == | == | 1 | |
| 3 | == | == | == | 1 |

In some examples, the record bank number of a writer that does not wish to write does not match any other. A writer is the first writer to the linked list implementing the queue or buffer if the leftmost 1 in its row is on the diagonal. A writer is the last writer to the linked list implementing the queue or buffer if the bottommost 1 in its column is on the diagonal. In some examples, if a writer is not the first writer to its record bank, then the previous writer is determined by the position of the rightmost 1 in its row, to the left of the diagonal. In some examples, these determinations can be made before the record banks and addresses have been assigned to the writers. The first writer may write its link to the address corresponding to the tail of the linked list implementing the queue or buffer, and subsequent writers write their links to the address of the previous writer's record. The last writer may update the tail of the list to the address of the record written by the last writer. The matrix in table 5 above is not used when there is only one writer in a processing cycle because the single writer is both the first and last writer of to the linked list implementing the queue or buffer. In some examples, if the same single writer always pushes to a particular record bank, then the stash entry corresponding to that record bank will only need to accept requests from that writer, or from the reader.

Figure 6G:
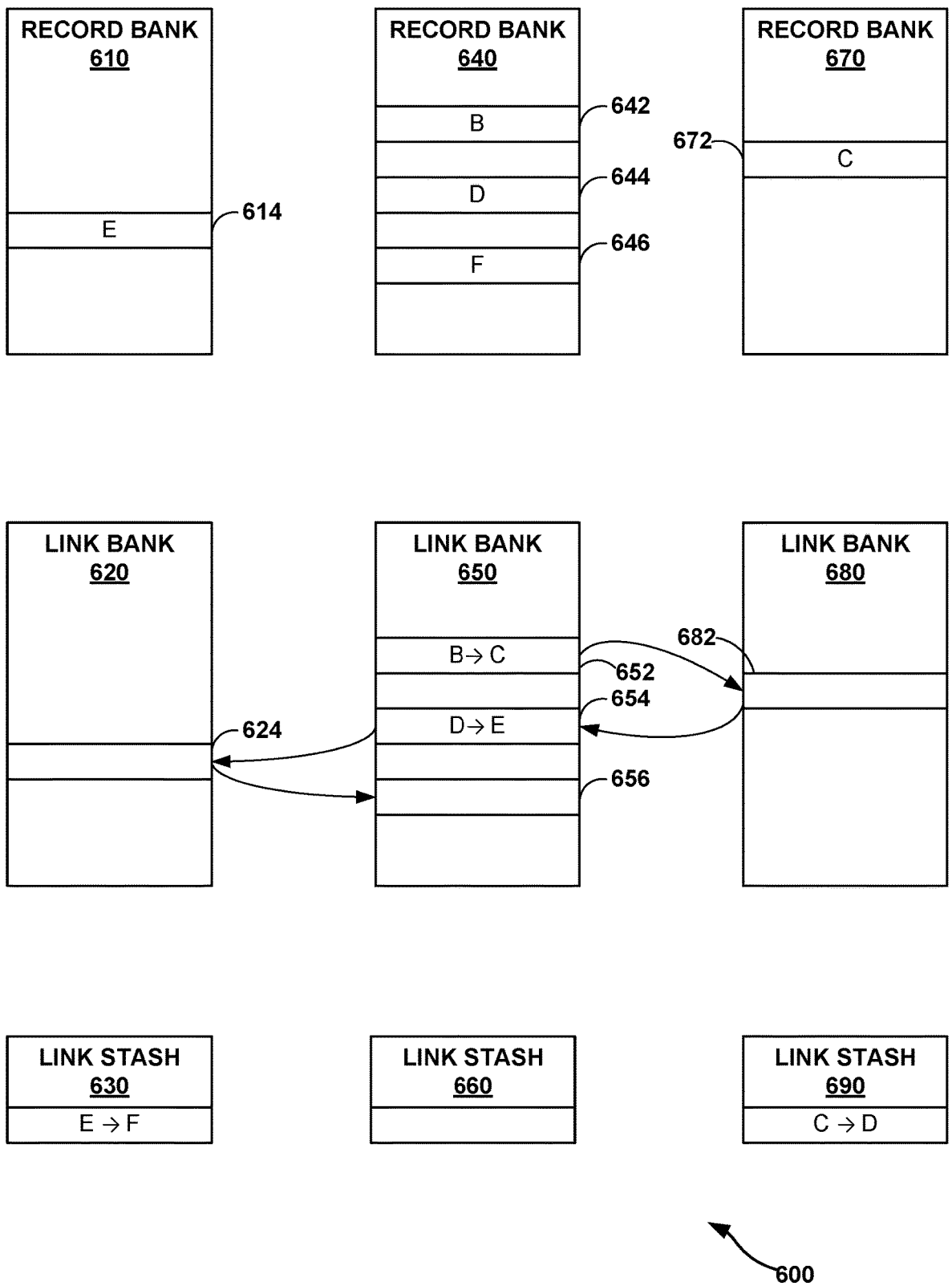

FIG. 6G illustrates data structures 600 after network packet A (or some portion of a network packet) is dequeued (e.g., read) from the linked list implementing the queue or buffer. To read packet A, address 614 from FIG. 6F may have been obtained from the head pointer (not shown). In some examples, a network packet may be read multiple times (e.g., for multicasting) by one or more readers. If this was the last time that a reader reads the network packet, the reader may set head pointer to the target address (e.g., address 642 corresponding to network packet B) contained in address 622 of link bank 620 of FIG. 6F, such that network packet B at address 642 or record bank 640 becomes the new head of the linked list implementing the buffer or queue. In some examples, memory at address 612 and/or memory at address 622 of FIG. 6F may be deallocated when network packet A is read for the last time.

Figure 7:
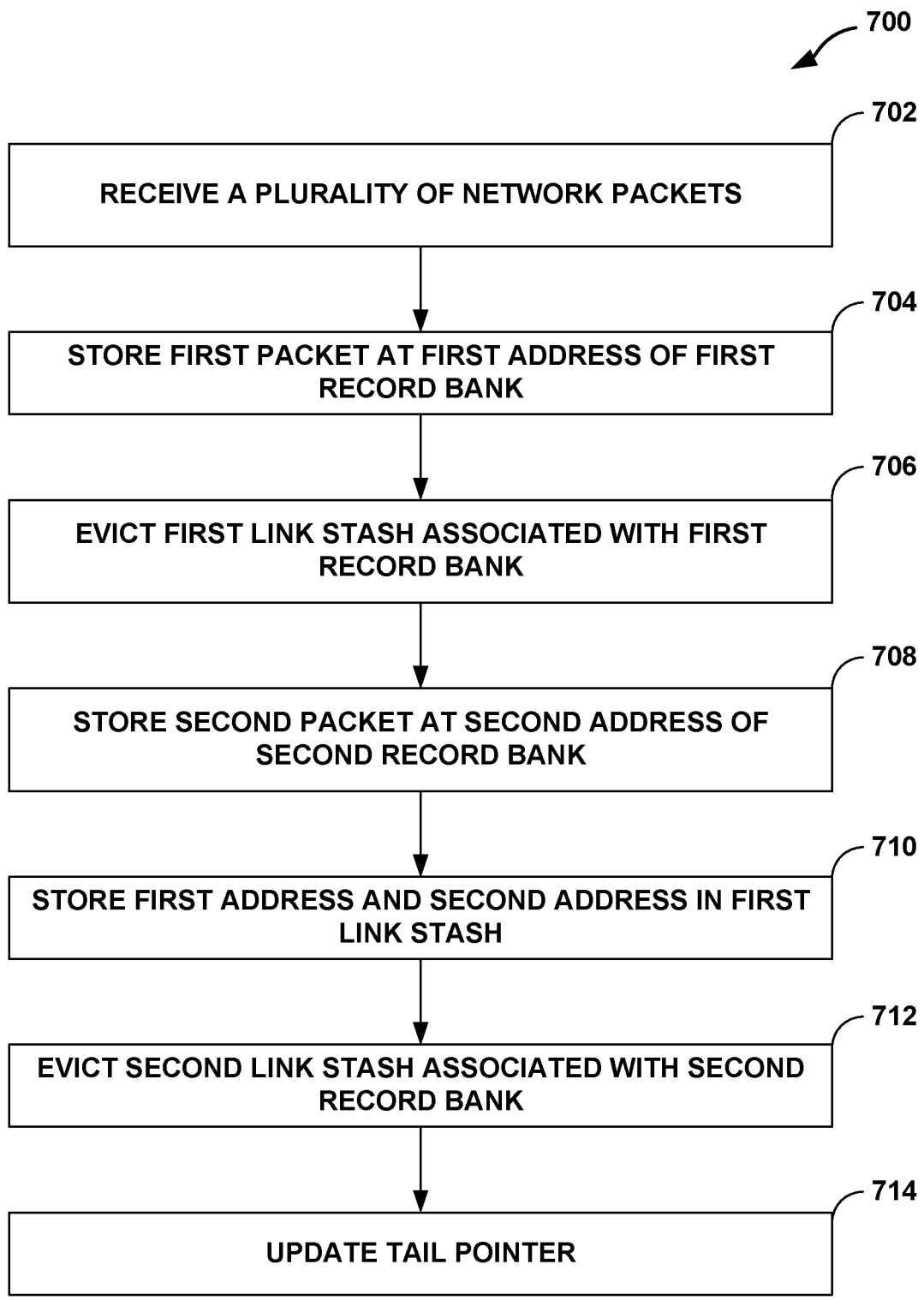
FIG. 7 is a flowchart illustrating example enqueue operations, according to aspects of the techniques described in this disclosure.

FIG. 7 is a flowchart 700 illustrating example enqueue operations, according to aspects of the techniques described in this disclosure. In some examples, flowchart may be performed by DPU 17 of FIG. 1 or 2, DPU 200 of FIG. 4, or DPU 460 of FIG. 5.

The DPU may receive a plurality of network packets (702). In some examples, the DPU receives the plurality of network packets during the same cycle. In response to receiving the plurality of network packets, the DPU may store a first packet (or some portion of the first packet) at a first address of a first record bank (704) (e.g., store network packet A in address 612 of record bank 610 as shown in FIG. 6A). The DPU may evict a first link stash associated with the first record bank (e.g., in response to storing the first packet at the first address of the first record bank). As described above, evicting the first link stash may comprise setting the valid bit of the first link stash to invalid (e.g., 0, NULL, FALSE, or any other value), storing (e.g., copying) the link contained in the first link stash to a first link bank associated with the first record bank (e.g., to preserve the link), and/or deallocating the memory in the first link stash. Evicting the first link stash allows another writer to store another link in the first link stash whenever another writer enqueues another network packet.

Each network packet or portion of network packets can be written to any available record bank. In some examples, each link is written to the link bank or link stash corresponding to the record bank in which the tail record resides. For example, the DPU may store a second network packet of the plurality of network packets at a second address of a second record bank (708), and store the first address and second address (e.g., the link or pointer between the first packet in the first record bank and the second packet in the second record bank) in the first link stash (710). In some examples, the DPU stores the first packet and the second packet in the same processing cycle. In some examples, the DPU stores the first packet and the second packet in different processing cycles. The DPU may also evict a second link stash associated with the record bank (712) after storing the second packet in the second record bank. Again, evicting the second link stash allows the DPU to store another link in the second link stash whenever another packet in enqueued. The DPU may then update the tail pointer to reference the second address (714), making the second packet the tail of the liked list implementing the queue or buffer. In some examples, the tail pointer is updated every time a packet (or some portion) is enqueued. In other examples, the tail pointer is updated only after enqueuing the last packet in a processing cycle. In some examples, the tail pointer is a globally addressed pointer. In certain examples, the steps of flowchart 700 may be performed during the same processing cycle.

Figure 8:
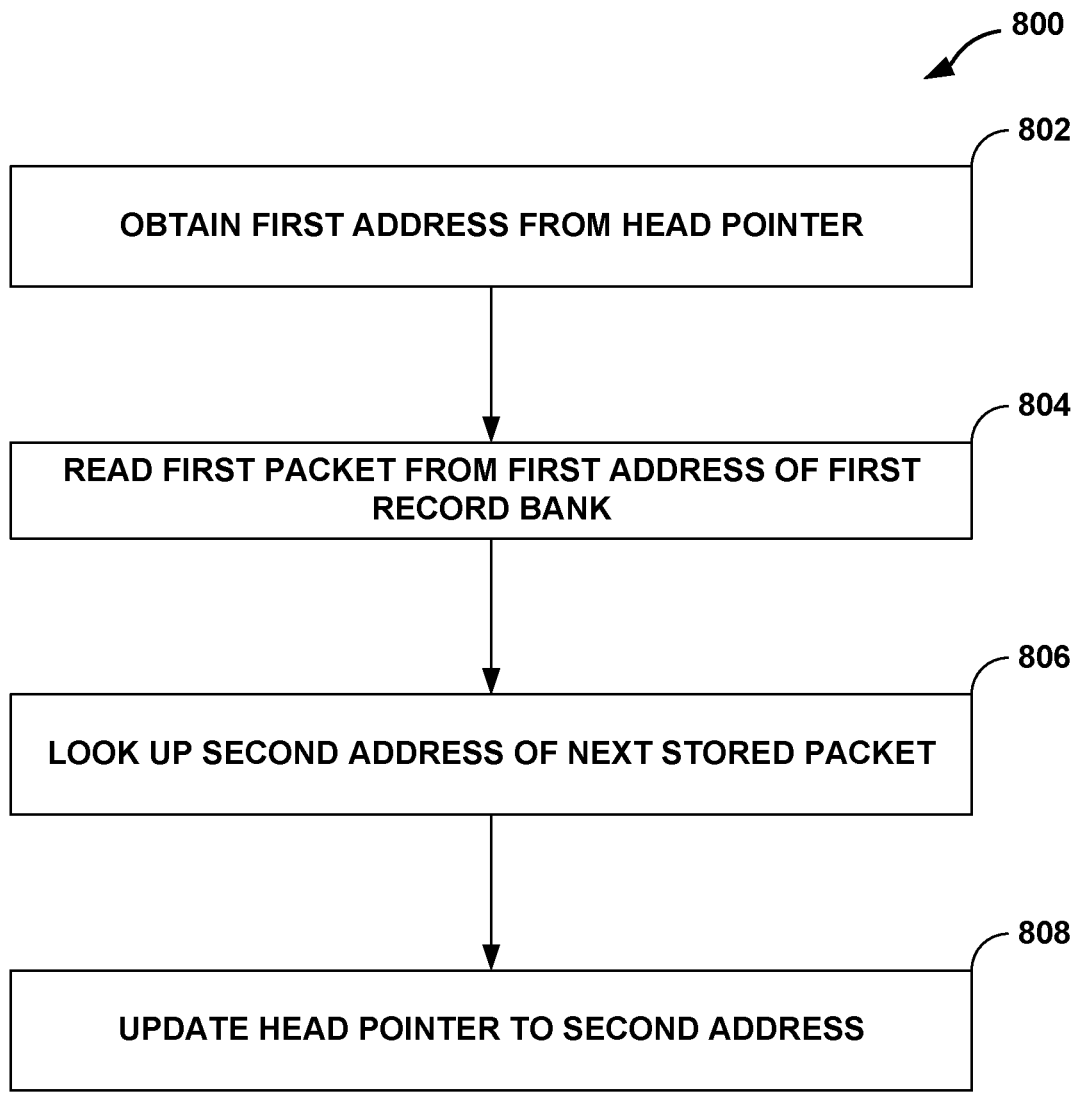
FIG. 8 is a flowchart illustrating example dequeue operations, according to aspects of the techniques described in this disclosure.

FIG. 8 is a flowchart 800 illustrating example dequeue operations, according to aspects of the techniques described in this disclosure. In some examples, flowchart may be performed by DPU 17 of FIG. 1 or 2, DPU 200 of FIG. 4, or DPU 460 of FIG. 5.

To dequeue a network packet (or some portion of that network packet), the DPU may obtain a first address from the head pointer (e.g., the address corresponding to the head of the linked list implementing the queue or buffer) (802). In some examples, the first address corresponds to a location at a first record bank and at a first link bank.

In response to obtaining the first address, the DPU may read the network packet (or portion of the network packet) from the first address of the first record bank (804). In some example, this network packet is then routed through an egress port.

Next, the DPU may look up the second address of the next stored packet (e.g., the network packet or portion of the network packet that follows the head packet) in the linked list implementing the queue or buffer (806). For example, the DPU may read the entry (e.g., the target address) stored in the first link stash corresponding to the first record bank. In some examples, the DPU reads the entry stored in the first link stash in accordance with a determination that the link stash entry is valid (e.g., a determination that the valid bit of the first link stash indicates the entry is valid) and that the link in the link stash entry (e.g., the current or origin address of the link entry) corresponds to the address in the head pointer (e.g., the current or origin address in the link is the same as the head address). In some examples, the DPU reads the entry stored in the first link bank at the first address in accordance with a determination that the link stash entry is not valid (e.g., a determination that the valid bit of the first link stash indicates the entry is not valid) or in accordance with a determination that the link in the link stash entry (e.g., the current or origin address of the link entry) does not correspond to the address in the head pointer (e.g., the current or origin address in the link is not the same as the head address).

The DPU may then update the head pointer to point to the second address (e.g., to the target address read from the first link stash or from the first link bank) (808). In some examples, a network packet may be read multiple times (e.g., for multicasting). In such an example, the DPU may only update the head pointer if this is the last time that network packet (that network packet portion) will be read. In some examples, the DPU may deallocate the memory at the first address of the first record bank and at the first address of the first link bank after the first network packet data is read. By deallocating the memory at record bank and link bank addresses, the DPU makes that memory available for enqueuing more network packet data.

Various aspects of the techniques may therefore provide for the subject matter outlined in the following clauses.

Clause 1. A method comprising: during a first cycle: receiving, at a first port of a device, a plurality of network packets; storing, by the device, at least some portion of a first packet of the plurality of network packets at a first address within a first record bank; storing, by the device and concurrent with storing the at least some portion of the first packet from the first address, at least some portion of a second packet of the plurality of network packets at a second address within a second record bank, different than the first record bank; storing, by the device, the first address within the first record bank and the second address within the second record bank in the first link stash associated with the first record bank; and updating, by the device, a tail pointer to reference the second address.

Clause 2. The method of clause 1, further comprising: during the first cycle: obtaining a head address from a head pointer, wherein the head address is the first address; reading the at least some portion of the first packet from the first address concurrent with storing the at least some portion of the first packet from the first address; and updating the head address of the head pointer to reference the second address within the second record bank.

Clause 3. The method of any of clauses 1-2, wherein the second address is obtained from the first link stash in accordance with a determination that the first link stash is valid and a determination that the first address of the link stash is the same as the head address obtained from the head pointer.

Clause 4. The method of any of clauses 1-2, wherein the second address is obtained from the first address of a first link bank associated with the first record bank in accordance with a determination that the first link stash is not valid or a determination that the first address of the link stash is not the same as the head address obtained from the head pointer.

Clause 5. The method of any of clauses 1-2, further comprising: deallocating memory at the first address within the first record bank.

Clause 6. The method of any of clauses 1-2, further comprising: deallocating memory corresponding to the first address within a first link bank associated with the first record bank.

Clause 7. The method of any of clauses 1-6, further comprising: during a second cycle: receiving, at the first port of the device, a second plurality of network packets; storing, by the device, at least some portion of a third packet of the second plurality of network packets at a third address within a third record bank; storing, by the device, the second address within the second record bank and the third address within the third record bank in a second link stash associated with the second record bank; evicting, by the device, a third link stash associated with the third record bank; storing, by the device and concurrent with storing the at least some portion of the third packet, at least some portion of a fourth packet of the second plurality of network packets at a fourth address within a fourth record bank, different than the third record bank; storing, by the device, the third address within the third record bank and the fourth address within the fourth record bank in the third link stash; evicting, by the device, a fourth link stash associated with the fourth record bank; and updating, by the device, the tail pointer to reference the fourth address.

Clause 8. The method of any of clauses 1-7, further comprising: evicting, by the device, a first link stash associated with the first record bank.

Clause 9. The method of any of clauses 1-7, further comprising: evicting, by the device, a second link stash associated with the second record bank in response to a determination that the second link stash is valid.

Clause 10. The method of any of clauses 1-7, further comprising: evicting, by the device, the first link stash associated with the first record bank, including invalidating the first link stash and storing the first address within the first record bank and the second address within the second record bank in a first link bank associated with the first record bank at the first address.

Clause 11. The method of any of clauses 1-10, wherein the tail pointer, first address, and the second address are globally addressed pointers.

Clause 12. The method of any of clauses 1-11, wherein each of the link stashes are implemented using single entry flops.

Clause 13. The method of any of clauses 1-12, wherein each of the record banks are implemented using single-port static random-access memories (SRAMs).

Clause 14. A device comprising: memory; and processing circuitry having access to the memory and configured to, during a first cycle: receive a plurality of network packets; store at least some portion of a first packet of the plurality of network packets at a first address within a first record bank; store, concurrent with storing the at least some portion of the first packet from the first address, at least some portion of a second packet of the plurality of network packets at a second address within a second record bank, different than the first record bank; store the first address within the first record bank and the second address within the second record bank in the first link stash associated with the first record bank; and update a tail pointer to reference the second address.

Clause 15. The device of clause 14, the processing circuitry further configured to, during the first cycle: obtain a head address from a head pointer, wherein the head address is the first address; read the at least some portion of the first packet from the first address concurrent with storing the at least some portion of the first packet from the first address; and update the head address of the head pointer to reference the second address within the second record bank.

Clause 16. The device of any of clauses 14-15, wherein the second address is obtained from the first link stash in accordance with a determination that the first link stash is valid and a determination that the first address of the link stash is the same as the head address obtained from the head pointer.

Clause 17. The device of any of clauses 14-15, wherein the second address is obtained from the first address of a first link bank associated with the first record bank in accordance with a determination that the first link stash is not valid or a determination that the first address of the link stash is not the same as the head address obtained from the head pointer.

Clause 18. The device of any of clauses 14-15, the processing circuitry further configured to: deallocate memory at the first address within the first record bank.

Clause 19. The device of any of clauses 14-15, the processing circuitry further configured to: deallocate memory corresponding to the first address within a first link bank associated with the first record bank.

Clause 20. The device of any of clauses 14-19, the processing circuitry further configured to, during a second cycle: receive, at the first port of the device, a second plurality of network packets; store, by the device, at least some portion of a third packet of the second plurality of network packets at a third address within a third record bank; store, by the device, the second address within the second record bank and the third address within the third record bank in a second link stash associated with the second record bank; evict, by the device, a third link stash associated with the third record bank; store, by the device and concurrent with storing the at least some portion of the third packet, at least some portion of a fourth packet of the second plurality of network packets at a fourth address within a fourth record bank, different than the third record bank; store, by the device, the third address within the third record bank and the fourth address within the fourth record bank in the third link stash; evict, by the device, a fourth link stash associated with the fourth record bank; and update, by the device, the tail pointer to reference the fourth address.

Clause 21. The device of any of clauses 14-20, the processing circuitry further configured to: evict, by the device, a first link stash associated with the first record bank.

Clause 22. The device of any of clauses 14-20, the processing circuitry further configured to: evict, by the device, a second link stash associated with the second record bank in response to a determination that the second link stash is valid.

Clause 23. The device of any of clauses 14-20, the processing circuitry further configured to: evict, by the device, the first link stash associated with the first record bank, including invalidating the first link stash and storing the first address within the first record bank and the second address within the second record bank in a first link bank associated with the first record bank at the first address.

Clause 24. The device of any of clauses 14-23, wherein the tail pointer, first address, and the second address are globally addressed pointers.

Clause 25. The device of any of clauses 14-24, wherein each of the link stashes are implemented using single entry flops.

Clause 26. The device of any of clauses 14-25, wherein each of the record banks are implemented using single-port static random-access memories (SRAMs).

Clause 27. A computer-readable storage medium comprising instructions that, when executed, configure processing circuitry of a device to, during a first cycle: receive a plurality of network packets; store at least some portion of a first packet of the plurality of network packets at a first address within a first record bank; store, concurrent with storing the at least some portion of the first packet from the first address, at least some portion of a second packet of the plurality of network packets at a second address within a second record bank, different than the first record bank; store the first address within the first record bank and the second address within the second record bank in the first link stash associated with the first record bank; and update a tail pointer to reference the second address.

Clause 28. The computer-readable storage medium of clause 27, the processing circuitry further configured to, during the first cycle: obtain a head address from a head pointer, wherein the head address is the first address; read the at least some portion of the first packet from the first address concurrent with storing the at least some portion of the first packet from the first address; and update the head address of the head pointer to reference the second address within the second record bank.

Clause 29. The computer-readable storage medium of any of clauses 27-28, wherein the second address is obtained from the first link stash in accordance with a determination that the first link stash is valid and a determination that the first address of the link stash is the same as the head address obtained from the head pointer.

Clause 30. The computer-readable storage medium of any of clauses 27-28, wherein the second address is obtained from the first address of a first link bank associated with the first record bank in accordance with a determination that the first link stash is not valid or a determination that the first address of the link stash is not the same as the head address obtained from the head pointer.

Clause 31. The computer-readable storage medium of any of clauses 27-30, the processing circuitry further configured to: deallocate memory at the first address within the first record bank.

Clause 32. The computer-readable storage medium of any of clauses 27-30, the processing circuitry further configured to: deallocate memory corresponding to the first address within a first link bank associated with the first record bank.

Clause 33. The computer-readable storage medium of any of clauses 27-32, the processing circuitry further configured to, during a second cycle: receive, at the first port of the device, a second plurality of network packets; store, by the device, at least some portion of a third packet of the second plurality of network packets at a third address within a third record bank; store, by the device, the second address within the second record bank and the third address within the third record bank in a second link stash associated with the second record bank; evict, by the device, a third link stash associated with the third record bank; store, by the device and concurrent with storing the at least some portion of the third packet, at least some portion of a fourth packet of the second plurality of network packets at a fourth address within a fourth record bank, different than the third record bank; store, by the device, the third address within the third record bank and the fourth address within the fourth record bank in the third link stash; evict, by the device, a fourth link stash associated with the fourth record bank; and update, by the device, the tail pointer to reference the fourth address.

Clause 34. The computer-readable storage medium of any of clauses 27-33, the processing circuitry further configured to: evict, by the device, a first link stash associated with the first record bank.

Clause 35. The computer-readable storage medium of any of clauses 27-33, the processing circuitry further configured to: evict, by the device, a second link stash associated with the second record bank in response to a determination that the second link stash is valid.

Clause 36. The computer-readable storage medium of any of clauses 27-33, the processing circuitry further configured to: evict, by the device, the first link stash associated with the first record bank, including invalidating the first link stash and storing the first address within the first record bank and the second address within the second record bank in a first link bank associated with the first record bank at the first address.

Clause 37. The computer-readable storage medium of any of clauses 27-36, wherein the tail pointer, first address, and the second address are globally addressed pointers.

Clause 38. The computer-readable storage medium of any of clauses 27-37, wherein each of the link stashes are implemented using single entry flops.

Clause 39. The computer-readable storage medium of any of clauses 27-38, wherein each of the record banks are implemented using single-port static random-access memories (SRAMs).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:
1. A method comprising:
  during a first cycle:
    receiving, at a first port of a device, a plurality of network packets;
    storing, by the device, at least some portion of a first packet of the plurality of network packets at a first address within a first record bank;
    storing, by the device and concurrent with storing the at least some portion of the first packet from the first address, at least some portion of a second packet of the plurality of network packets at a second address within a second record bank, different than the first record bank;
    storing, by the device, the first address within the first record bank and the second address within the second record bank in the first link stash associated with the first record bank;

updating, by the device, a tail pointer to reference the second address; and evicting, by the device, the first link stash associated with the first record bank, including invalidating the first link stash and storing the first address within the first record bank and the second address within the second record bank in a first link bank associated with the first record bank at the first address.

2. The method of claim 1, further comprising:
during the first cycle:
obtaining a head address from a head pointer, wherein the head address is the first address;
reading the at least some portion of the first packet from the first address concurrent with storing the at least some portion of the first packet from the first address; and
updating the head address of the head pointer to reference the second address within the second record bank.

3. The method of claim 1, wherein the second address is obtained from the first link stash in accordance with a determination that the first link stash is valid and a determination that the first address of the link stash is the same as the head address obtained from the head pointer.

4. The method of claim 1, wherein the second address is obtained from the first address of a first link bank associated with the first record bank in accordance with a determination that the first link stash is not valid or a determination that the first address of the link stash is not the same as the head address obtained from the head pointer.

5. The method of claim 1, further comprising deallocating memory at the first address within the first record bank.

6. The method of claim 1, further comprising deallocating memory corresponding to the first address within a first link bank associated with the first record bank.

7. The method of claim 1, further comprising:
during a second cycle:
receiving, at the first port of the device, a second plurality of network packets;
storing, by the device, at least some portion of a third packet of the second plurality of network packets at a third address within a third record bank;
storing, by the device, the second address within the second record bank and the third address within the third record bank in a second link stash associated with the second record bank;
evicting, by the device, a third link stash associated with the third record bank;
storing, by the device and concurrent with storing the at least some portion of the third packet, at least some portion of a fourth packet of the second plurality of network packets at a fourth address within a fourth record bank, different than the third record bank;
storing, by the device, the third address within the third record bank and the fourth address within the fourth record bank in the third link stash;
evicting, by the device, a fourth link stash associated with the fourth record bank; and
updating, by the device, the tail pointer to reference the fourth address.

8. The method of claim 1, further comprising evicting, by the device, a second link stash associated with the second record bank in response to a determination that the second link stash is valid.

9. The method of claim 1, wherein the tail pointer, first address, and the second address are globally addressed pointers.

10. The method of claim 1, wherein each of the link stashes are implemented using single entry flops.

11. The method of claim 1, wherein each of the record banks are implemented using single-port static random-access memories (SRAMs).

12. A device comprising:
memory; and
processing circuitry having access to the memory and configured to, during a first cycle:
receive a plurality of network packets;
store at least some portion of a first packet of the plurality of network packets at a first address within a first record bank;
store, concurrent with storing the at least some portion of the first packet from the first address, at least some portion of a second packet of the plurality of network packets at a second address within a second record bank, different than the first record bank;
store the first address within the first record bank and the second address within the second record bank in the first link stash associated with the first record bank;
update a tail pointer to reference the second address; and
evict the first link stash associated with the first record bank, including invalidating the first link stash and storing the first address within the first record bank and the second address within the second record bank in a first link bank associated with the first record bank at the first address.

13. The device of claim 12, the processing circuitry further configured to, during the first cycle:
obtain a head address from a head pointer, wherein the head address is the first address;
read the at least some portion of the first packet from the first address concurrent with storing the at least some portion of the first packet from the first address; and
update the head address of the head pointer to reference the second address within the second record bank.

14. The device of claim 12, wherein the second address is obtained from the first link stash in accordance with a determination that the first link stash is valid and a determination that the first address of the link stash is the same as the head address obtained from the head pointer.

15. The device of claim 12, wherein the second address is obtained from the first address of a first link bank associated with the first record bank in accordance with a determination that the first link stash is not valid or a determination that the first address of the link stash is not the same as the head address obtained from the head pointer.

16. The device of claim 12, the processing circuitry further configured to deallocate memory at the first address within the first record bank.

17. The device of claim 12, the processing circuitry further configured to deallocate memory corresponding to the first address within a first link bank associated with the first record bank.

18. The device of claim 12, the processing circuitry further configured to, during a second cycle:
receive, at the first port of the device, a second plurality of network packets;
store, by the device, at least some portion of a third packet of the second plurality of network packets at a third address within a third record bank;

store, by the device, the second address within the second record bank and the third address within the third record bank in a second link stash associated with the second record bank;

evict, by the device, a third link stash associated with the third record bank;

store, by the device and concurrent with storing the at least some portion of the third packet, at least some portion of a fourth packet of the second plurality of network packets at a fourth address within a fourth record bank, different than the third record bank;

store, by the device, the third address within the third record bank and the fourth address within the fourth record bank in the third link stash;

evict, by the device, a fourth link stash associated with the fourth record bank; and update, by the device, the tail pointer to reference the fourth address.

19. The device of claim 12, the processing circuitry further configured to:

evict, by the device, a second link stash associated with the second record bank in response to a determination that the second link stash is valid.

20. The device of claim 12, wherein the tail pointer, first address, and the second address are globally addressed pointers.

21. The device of claim 12, wherein each of the link stashes are implemented using single entry flops.

22. The device of claim 12, wherein each of the record banks are implemented using single-port static random-access memories (SRAMs).

23. A non-transitory computer-readable storage medium comprising instructions that, when executed, configure processing circuitry of a device to, during a first cycle:

receive a plurality of network packets;

store at least some portion of a first packet of the plurality of network packets at a first address within a first record bank;

store, concurrent with storing the at least some portion of the first packet from the first address, at least some portion of a second packet of the plurality of network packets at a second address within a second record bank, different than the first record bank;

store the first address within the first record bank and the second address within the second record bank in the first link stash associated with the first record bank;

update a tail pointer to reference the second address; and evict the first link stash associated with the first record bank, including invalidating the first link stash and storing the first address within the first record bank and the second address within the second record bank in a first link bank associated with the first record bank at the first address.

24. The non-transitory computer-readable storage medium of claim 23, the processing circuitry further configured to, during the first cycle:

obtain a head address from a head pointer, wherein the head address is the first address;

read the at least some portion of the first packet from the first address concurrent with storing the at least some portion of the first packet from the first address; and update the head address of the head pointer to reference the second address within the second record bank.

25. The non-transitory computer-readable storage medium of claim 23, wherein the second address is obtained from the first link stash in accordance with a determination that the first link stash is valid and a determination that the first address of the link stash is the same as the head address obtained from the head pointer.

26. The non-transitory computer-readable storage medium of claim 23, wherein the second address is obtained from the first address of a first link bank associated with the first record bank in accordance with a determination that the first link stash is not valid or a determination that the first address of the link stash is not the same as the head address obtained from the head pointer.

27. The non-transitory computer-readable storage medium of claim 23, the processing circuitry further configured to deallocate memory at the first address within the first record bank.

28. The non-transitory computer-readable storage medium of claim 23, the processing circuitry further configured to deallocate memory corresponding to the first address within a first link bank associated with the first record bank.

29. The non-transitory computer-readable storage medium of claim 23, the processing circuitry further configured to, during a second cycle:

receive, at the first port of the device, a second plurality of network packets;

store, by the device, at least some portion of a third packet of the second plurality of network packets at a third address within a third record bank;

store, by the device, the second address within the second record bank and the third address within the third record bank in a second link stash associated with the second record bank;

evict, by the device, a third link stash associated with the third record bank;

store, by the device and concurrent with storing the at least some portion of the third packet, at least some portion of a fourth packet of the second plurality of network packets at a fourth address within a fourth record bank, different than the third record bank;

store, by the device, the third address within the third record bank and the fourth address within the fourth record bank in the third link stash;

evict, by the device, a fourth link stash associated with the fourth record bank; and update, by the device, the tail pointer to reference the fourth address.

30. The non-transitory computer-readable storage medium of claim 23, the processing circuitry further configured to evict, by the device, a second link stash associated with the second record bank in response to a determination that the second link stash is valid.

31. The non-transitory computer-readable storage medium of claim 23, wherein the tail pointer, first address, and the second address are globally addressed pointers.

32. The non-transitory computer-readable storage medium of claim 23, wherein each of the link stashes are implemented using single entry flops.

33. The non-transitory computer-readable storage medium of claim 23, wherein each of the record banks are implemented using single-port static random-access memories (SRAMs).

* * * * *